(12) United States Patent
Miyamoto et al.

(10) Patent No.: US 8,229,164 B2
(45) Date of Patent: Jul. 24, 2012

(54) PEDESTRIAN TRACKING METHOD AND PEDESTRIAN TRACKING DEVICE

(75) Inventors: Ryusuke Miyamoto, Ikoma (JP);
Jumpei Ashida, Kawasaki (JP)

(73) Assignee: SYNTHESIS Corporation, Osaka-shi (JP)

( * ) Notice: Subject to any disclaimer, the term of this patent is extended or adjusted under 35 U.S.C. 154(b) by 867 days.

(21) Appl. No.: 12/373,157

(22) PCT Filed: Feb. 8, 2007

(86) PCT No.: PCT/JP2007/052271
§ 371 (c)(1),
(2), (4) Date: Jan. 9, 2009

(87) PCT Pub. No.: WO2008/007471
PCT Pub. Date: Jan. 17, 2008

(65) Prior Publication Data
US 2010/0002908 A1    Jan. 7, 2010

(30) Foreign Application Priority Data

Jul. 10, 2006  (JP) .................................. 2006-189849

(51) Int. Cl.
*G06K 9/00* (2006.01)
(52) U.S. Cl. ........................................................ 382/103
(58) Field of Classification Search .................. 382/103, 382/107; 348/143, 154; 375/240.08
See application file for complete search history.

(56) References Cited

FOREIGN PATENT DOCUMENTS

| JP | 2005-165688 A | 6/2005 |
| JP | 2005-339100 A | 12/2005 |

OTHER PUBLICATIONS

Isard and MacCormick "A Bayesian Multiple-Blob Tracker", IEEE International Conference on Computer Vision, pp. 34-41, 2001.*
Lipton et al (Real-time human motion analysis by image skeletonization, Carnegie Mellon University, IEEE 1998, pp. 15-21.*
Toru Katayama, "Applied Kalamn Filter" Asakura Publishing Co., 1983, pp. 26-28.
Michael Isard et al., "Condensation—Conditional Density Propagation for Visual Tracking" International Journal on Computer Vision, vol. 29, 1989, pp. 1-36.
Genshiro Kitagawa, "Introduction to Time Series Analysis", Iwanami Publishing Company, 2005, p. 209.
M. Isard et al, "BraMBLe: A Bayesian Multipe-Blob Tracker" IEEE International Conference on Computer Vision 2001, pp. 1-8.
International Search Report dated Mar. 6, 2007 w/English translation (two (2) pages).

* cited by examiner

Primary Examiner — Anand Bhatnagar
Assistant Examiner — Amara Abdi
(74) Attorney, Agent, or Firm — Crowell & Moring LLP

(57) ABSTRACT

The pedestrian tracking device comprises: an image receiving unit for receiving, in time series, images continuously in time by an image capturing device; a pedestrian region selecting unit for sampling candidate pedestrian regions from an image received by the image receiving unit and for selecting a certain pedestrian region; a tracking unit provided in time series with the pedestrian region selected by the pedestrian region selecting unit for predicting motion of the pedestrian region and associating it with time direction by use of a skeleton model obtained by modeling a pedestrian, a distance-transformed image obtained from the pedestrian region and a Monte Carlo filter so as to track the pedestrian region; and a pedestrian trajectory display for displaying, in time series, the pedestrian region tracked by the tracking unit.

20 Claims, 17 Drawing Sheets

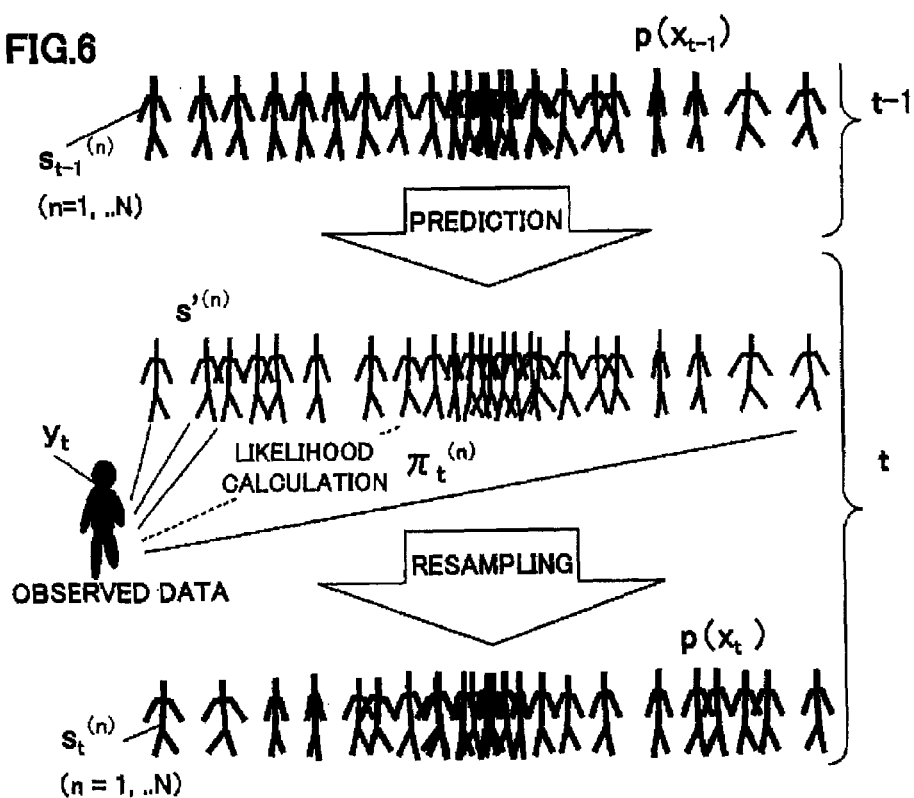
FIG. 6
  
FIG.7A1  FIG.7A2  FIG.7A3
  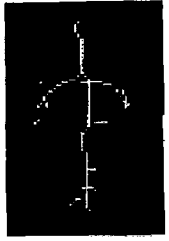
FIG.7B1  FIG.7B2  FIG.7B3
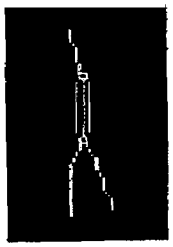  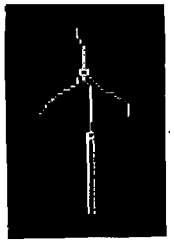
FIG.7C1  FIG.7C2  FIG.7C3

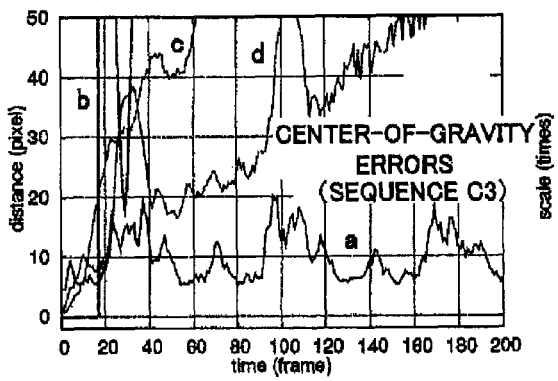
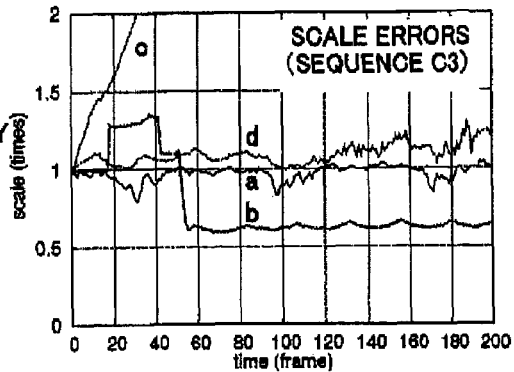
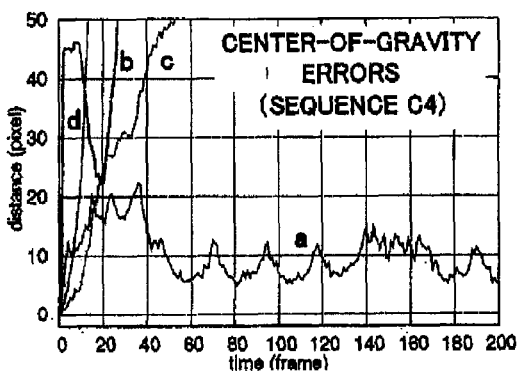
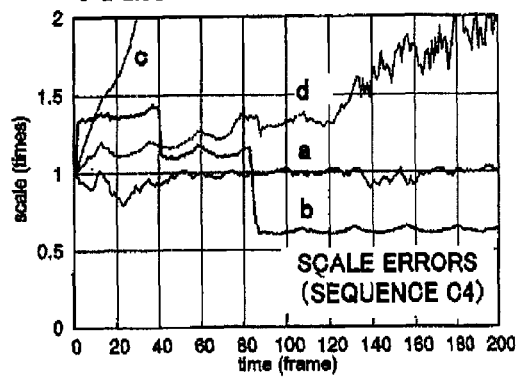
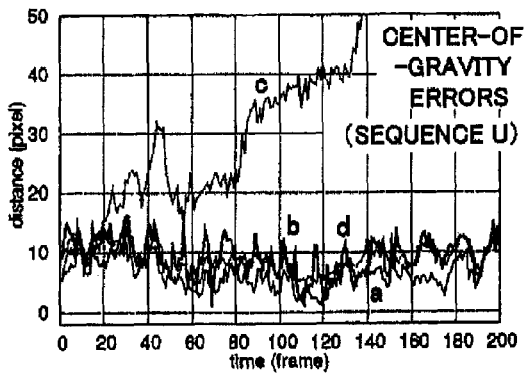
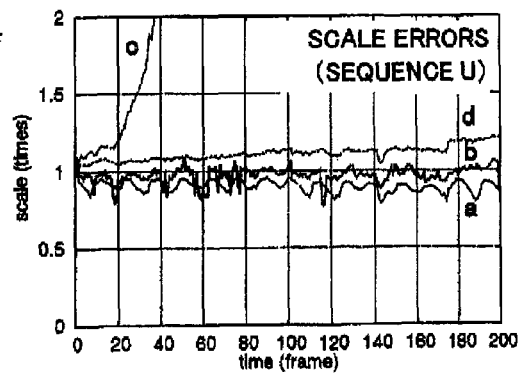

PEDESTRIAN TRACKING METHOD AND PEDESTRIAN TRACKING DEVICE

TECHNICAL FIELD

The present invention relates to a pedestrian tracking method and a pedestrian tracking device for tracking a pedestrian based on images obtained by continuously capturing a pedestrian.

BACKGROUND ART

Conventionally, there is a method and device which automatically tracks the motion of a moving object, particularly motion of a human body, on the basis of image data, and which is used, for example, in the music field and the sports field for ability development based on the analysis and evaluation of motion and for various purposes. For example, a body motion analysis device is known which: extracts human silhouette images from a video image of a dancing examinee input by a computer; detects respective parts of the examinee from the human silhouette images based on color processing; converts the human silhouette images to skeleton images; subjects the skeleton images to Hough transform to approximate the respective parts by lines; and tracks the respective parts in time using a Kalman filter (refer to e.g. Japanese Laid-open Patent Publication 2005-339100).

The above-described body motion analysis device is a device which subjects Hough parameters having been tracked in time to SVD (Singular Value Decomposition) to detect a motion feature of the body motion, and thereafter Fourier-transforms time-series data of the extracted motion feature for frequency analysis so as to extract and evaluate rhythmic elements of the entire body motion of the examinee.

Further, in a pedestrian tracking method and a pedestrian tracking device for automatically tracking a pedestrian based on image data, attempts have been made to increase the accuracy and efficiency to suit uses such as accident prevention, surveillance and so on. More specifically, a more secure and faster pedestrian tracking method or device without malfunction (mistracking) is required.

Now, various filter technologies are used as means to process images for estimating the motion of a pedestrian, and associating it with the time direction. A filter is a method or device for outputting an estimate of a desired response to an input signal such as image data. A filter used for pedestrian tracking removes noise from the current input signal with added noise, and outputs a future signal value as the estimate of the desired response. Such future estimation using a filter is called filter prediction.

For example, a Kalman filter is widely used in the field of object tracking to perform tracking of moving objects in general as used in the above-described patent document (Japanese Laid-open Patent Publication 2005-339100), and is also applied to the pedestrian tracking.

An outline of tracking using a Kalman filter will be described. A Kalman filter estimates state vector $x_t$ from observation vector $y_t$ sequentially at each time. Here, the subscript t in $y_t$, $x_t$ and later-described $F_t$ indicates a certain time, while a time one step before the time is indicated by t−1. In other words, observation (e.g. capture of time-series images) is made at respective time intervals (steps). The time notation using these subscripts will be similarly used hereinafter. The observation vector $y_t$ is a vector in observation space which is mathematically defined by observable time-series data. The state vector $x_t$ is a vector in space, called state space, representing the state of a system to essentially determine the observation vector, and is assumed to follow a Gauss-Markov process (refer to e.g. "Applied Kalman Filter" by Toru Katayama, Asakura Publishing Co., 1983).

Further, a Kalman filter assumes linearity and gaussianity in both the system model equation $x_t = F_t x_{t-1} + G_t v_t$ which characterizes the transition of the state vector in the time direction, and the observation model equation $y_t = H_t x_t + w_t$ which characterizes the mapping from the state vector to the observation vector. Here, $v_t$ and $w_t$ are Gaussian white noises, called plant noise and observation noise, respectively, while $F_t$, $G_t$ and $H_t$ are matrices, called state transition matrix, driving matrix and observation matrix, respectively. It is seen from the form of these equations that the observation vector $y_t$ and the state vector $x_t$ have linearity.

The assumption of gaussianity in each of the above-described models corresponds to setting an assumption of Gaussian distribution in the probability distribution of the state vector $x_t$ in the state space, namely state probability distribution p(x). In the pedestrian tracking, the state probability distribution deviates in some cases from the Gaussian distribution in situations such as presence of occlusion to cause a pedestrian to be temporarily hidden behind, sudden change in velocity of a tracking target (pedestrian), presence of multiple objects similar to the tracking target, and so on. If a Kalman filter is applied in such cases, it means that the state is estimated using a Gaussian distribution as shown in FIG. 36B although a distribution as shown in FIG. 36A, which is different from a Gaussian distribution, is assumed as an actual state probability distribution. Thus, due to the application limit of a Kalman filter which assumes a Gaussian distribution, it is not possible to estimate the state with sufficient accuracy.

Thus, there has been proposed a tracking method, called CONDENSATION (conditional density propagation), using a Monte Carlo filter which does not assume Gaussianity or linearity (refer to e.g. "Conditional Density Propagation for Visual Tracking" by Michael Isard and Andrew Blake, International Journal on Computer Vision, Vol. 29, pp 5-28 (1989)).

If a Monte Carlo filter is used, a state vector at each time is sequentially estimated based on an observation vector, similarly as in the case where a Kalman filter is used. In the estimation using a Monte Carlo filter, a state probability distribution is generated based on the distribution of particles each with a vector pointing to a point in the state space. Thus, a Monte Carlo filter can handle nonlinear and non-Gaussian type models obtained by generalizing the state space model and the system model in the above-described Kalman filter (refer, for example, to "Introduction to Time Series Analysis" by Genshiro Kitagawa, Iwanami Publishing Company, 2005).

Thus, it is considered that the CONDENSATION can achieve a highly accurate probabilistic state estimation, namely tracking with less malfunction, even in a situation of presence of occlusion and sudden velocity change where conventional methods e.g. assuming Gaussianity may fail.

(Outline of Monte Carlo Filter)

Here, an outline of a Monte Carlo filter will be described. The system model and the observation model in a Monte Carlo filter are expressed by the following equations (1) and (2):

System Model:

$$x_t = F(x_{t-1}, v_t) \tag{1}$$

Observation Model:

$$y_t = H(x_t, w_t) \tag{2}$$

The state probability distribution $p(x_t)$ of the state vector $x_t$ in the state space can be expressed by a set of N particles $\{s_t^{(n)}, n=1, \ldots, N\}$ as in the following equations (3) and (4), where $s_t^{(n)}$ is a vector which an n-th particle has and which points to a point in the state space X, while $\delta(x)$ is a delta function:

$$p(x_t) \cong \frac{1}{N} \sum_{n=1}^{N} \delta(x_t - s_t^{(n)}) \tag{3}$$

$$\delta(x) = \begin{cases} +\infty & x = 0 \\ 0 & x \neq 0 \end{cases} \tag{4}$$

The state probability distribution of a Monte Carlo filter is represented by a discrete density of particles. For example, in the case where the distribution shown in FIG. 37A is a true probability distribution, the probability distribution in a Monte Carlo filter is expressed by the discrete density of particles as shown in FIG. 37B. Thus, a higher number of particles leads to a more accurate representation of the state probability distribution. Any state probability distribution can be represented by such a representation using particles.

(State Estimation Algorithm Using Monte Carlo Filter)

Next, a state estimation algorithm using the above-described Monte Carlo filter will be described. FIG. 38 shows a process performed at time steps for N particles $s^{(1)}, s^{(2)}, \ldots, s^{(N)}$. In this Figure, the horizontal axis is a time axis while the vertical axis represents state space (represented by one dimension). The size of each particle shown by a black circle or a white dashed circle indicates the likelihood (likeliness or possibility of occurrence) of the state. As shown in this Figure, the process using a Monte Carlo filter is a repetition of a three-step process of prediction, measurement and resampling (resetting).

Based on the above-described repetition of the three-step process, the state probability distribution $p(x_t)$ at time t is sequentially obtained by using observed data and state probability distribution $p(x_{t-1})$ at previous time t−1, and the state probability distribution at each time is sequentially estimated. Further, the state probability distribution is flexibly determined without assuming Gaussianity. Thus, the state probability distribution is corrected by the observed data, and the next state probability distribution is obtained by using the corrected state probability distribution, so that the trajectory of a particle in the state space representing a tracking result becomes more true.

For the respective particles (n=1, ..., N), the prediction step predicts the following state $s'_t^{(n)}$ according to the process probability density $p(x_t|x_{t-1}=s_{t-1}^{(n)})$ (hereafter refer to the above-described "Introduction to Time Series Analysis" by Genshiro Kitagawa).

For the respective particles, the measurement step calculates the likelihood $\pi_t^{(n)}$ in the predicted state according to the observation probability density $p(y_t|x_t)$. In other words, this step obtains the similarity (likelihood) between the state of a tracking target model corresponding to the respective particles and the observed data (image of the tracking target) by making a comparison based on properly set comparison method. Here, $y_t$ is an observation vector (observed data) at time t.

The resampling step repeats the following process (i), (ii) and (iii) N times according to the number of particles N so as to sample a set of particles $\{s_t^{(n)}, n=1, \ldots, N\}$ at time t. In other words, this step redistributes (resets) the N particles in the state space by using the likelihood of each particle representing the predicted state to allocate a larger number of particles at locations of particles with a higher likelihood, and allocate a smaller number, or none, of particles at locations of particles with a lower likelihood, so as to determine the state probability distribution at time t which reflects the correction by the observed data.

(i) Generate a random number $u_t^{(n)} \in [0,1]$ following uniform distribution;

(ii) Obtain a natural number i satisfying the following inequality and equation;

$$\frac{1}{C} \sum_{l=1}^{i-1} \pi_t^{(l)} < u_t^{(n)} \leq \frac{1}{C} \sum_{l=1}^{i} \pi_t^{(l)} \tag{5}$$

where $$C = \sum_{l=1}^{N} \pi_t^{(l)} \tag{6}$$

(iii) $s_t^{(n)} = s_t'^{(i)}$ is set.

The state probability distribution $p(x_t)$ of particles at time t is obtained by the above-described three-step process of prediction, measurement and resampling (resetting). When using a Monte Carlo filter, it is necessary, depending on applications, to properly set conditions such as: how to form a state space X, i.e. a model of target and so on; how to make a state transition in the prediction step such as, inter alia, constraint conditions for the transition; what to use as a calculation method, i.e. comparison method, of the likelihood of particles in the measurement step; and so on.

Next, a contour tracking to track a target using the contour(s) of the target will be described as an example of using CONDENSATION. The contour tracking method models the contour of the tracking target by B-spline curve, and defines a space composed e.g. of the coordinate values of control points of the spline curve as a state space. The motion (transition) of a state vector pointing to a point in the state space is estimated (predicted) using a Monte Carlo filter. In other words, a point in the state space is in one-to-one correspondence with a state of the contour, so that in the state space, the current state moves, i.e. transitions, from a point (state) to another point (state) as time passes. The transition is considered to be probabilistically achieved under certain constraint conditions.

When predicting the state transition, it is possible to increase the accuracy of prediction by restricting transitionable states in advance, i.e. by constraining the state transition. In the conventional contour tracking using CONDENSATION, the state transition is constrained by pre-learning using principal component analysis. In the following, the state space, state transition and calculation of likelihood in the contour tracking using CONDENSATION will be shown.

(State Space)

Approximate a contour of a tracking target by B-spline curve, defining the positions and velocities of control points of the B-spline curve as a state space X.

(State Transition)

Use principal component analysis to pre-learn supervised data. When the state space has M dimensions, determine state transition ($s_t'$−$s_{t-1}$) based on a linear combination of the first principal component vector to the L-th principal component vector (L<M) to reduce the degree of freedom from M to L. This constrains the state transition to allow the state to scatter in the direction of the localized supervised data, i.e. to follow the characteristics of the supervised data.

(Calculation of Likelihood)

The likelihood π of particles is calculated by comparing the B-spline curve with input image according to the following procedure. First, set base points consisting of K points on the predicted B-spline curve, and set lines extending therefrom in the normal direction and having a length of μ. Next, detect, on each of these lines, an edge (image contour of target portion) which is a feature point of the image, and assume that the distance from the k-th base point to the detected edge is $\delta_k$. The likelihood π of particles in the state space representing the state of the contour is calculated using this $\delta_k$ according to the following formula (7):

$$\pi \propto \exp\left\{-\sum_{k=1}^{K} \frac{1}{2rK}(\min(\delta_k, \mu))^2\right\} \quad (7)$$

The above-described contour tracking using CONDENSATION is applied to the tracking of hand palms and leaves, achieving excellent results. Further, a pedestrian tracking method using a framework of CONDENSATION has been proposed (refer to e.g. "A Bayesian Multiple-Blob Tracker" by Isard and MacCormick, IEEE International Conference on Computer Vision, pp 34-41, 2001).

However, the application of the contour tracking using CONDENSATION to pedestrian tracking has the following problem. An object such as a pedestrian considerably changes with time in the direction and magnitude of contour transition. It is generally difficult to properly constrain the state transition for the contour of such object, so that the contour tracking using CONDENSATION is not suitable for pedestrian tracking.

Referring to FIGS. 39A, 39B and 39C, the contour transition of a pedestrian will be described. These Figures show regions of a pedestrian detected by three successive frames in an actual sequence. Between the two pedestrian regions of FIGS. 39A and 39B, there is a significant change in the lower body contour although there is no significant change in the upper body contour. On the other hand, between FIGS. 39B and 39C, there is no significant change in the lower body contour although there is a significant change in the upper body contour. This shows that the contour of a pedestrian changes with time, i.e. transitions in state, in which the changing parts and the magnitude of the change also change with time.

Further, as described above, the contour tracking using CONDENSATION constrains the state transition based on principal component analysis. Thus, significant effects of constraint can be obtained when the supervised data in the state space is localized in a certain direction. However, there are various contour transitions of a pedestrian, and the supervised data is scattered in distribution with less tendency. It is impossible in principle to properly constrain the state transition for such state space based on principal component analysis. The constraint of the state transition is for the purpose of increasing the accuracy of predicting the state transition. Thus, if the constrain is not possible, an increase in the accuracy of prediction cannot be expected, making it impossible to achieve tracking without malfunction.

Thus, in order to achieve a robust pedestrian tracking with high stability without malfunction, a feature which allows better stability of the direction and magnitude of the state transition needs to be used instead of the method using contour as a feature so as to increase the accuracy of prediction based on the feature.

Further, the use of a Monte Carlo filter eliminates the need for assuming Gaussianity as in the case of using a Kalman filter, making it possible to achieve a more robust tracking, so that various tracking methods using this framework have been proposed. However, there has not been proposed a practical method suitable for pedestrian tracking. For example, the pedestrian tracking using CONDENSATION as disclosed in the above-described paper by Isard and MacCormick is used in the case of an image having a large pedestrian region, and performing tracking based on accurate pedestrian models e.g. using three-dimensional information, and is not suitable for practical use in which it is required to be adapted to an image with a small pedestrian region.

Further, in pedestrian tracking for surveillance applications, a grey scale image with a large dynamic range is used, and in addition an infrared camera is considered to be used. Thus, a tracking method which does not use color information is desired in order to enable pedestrian tracking adapted to such situations.

DISCLOSURE OF INVENTION

An object of the present invention, to solve the problems described above, is to provide a pedestrian tracking method and a pedestrian tracking device with a simple structure for predicting the motion of a pedestrian in images without using color information, making it possible to achieve a robust pedestrian tracking.

In order to achieve the above object, the present invention provides a pedestrian tracking method provided in time series with a certain pedestrian region appearing in images captured continuously in time for predicting and associating motion of the pedestrian region with time direction by use of a Monte Carlo filter so as to track the pedestrian region, comprising the steps of: building a skeleton model of a pedestrian model with multiple nodes and multiple sticks connecting the nodes, and defining, in a state space of a multidimensional space representing points in one-to-one correspondence with states of the skeleton model, particles at the points provided with realization probability attributes of the states represented by the points of the state space, and further setting multiple particles of the skeleton model as an initial state in the state space; predicting, for a set of particles set in the state space at a first time, a set of particles representing a state at a second time after the first time using Monte Carlo filter method; converting a pedestrian region given at the second time to a binary image, and subjecting the binary image to distance transform so as to generate observed data comprised of the distance-transformed image; comparing each skeleton model predicted in the prediction step with the distance-transformed image so as to calculate a likelihood of each state of the skeleton model at the second time; and sampling a set of particles of the skeleton model in the state space based on the respective likelihoods of the skeleton model calculated in the above step, and setting the sampled set of particles as a new set of particles in the state space at the second time, wherein the pedestrian region is tracked by performing, at each time increment, the steps from the above step of predicting the set of particles to the step of setting the sampled set of particles as the new set of particles so as to predict and associate, with time direction, the motion of the particles of the skeleton model in the state space.

According to such a structure, a Monte Carlo filter is used, and a skeleton model is used as a model of a pedestrian. Thus, it is possible to achieve more robust tracking, following changes with time of the shape of a pedestrian region in an image, than when using a contour model of the pedestrian.

More specifically, the skeleton model can model the trunk and limbs of the pedestrian, so that in contrast to the use of contour, the changes of the shape of the skeleton model can be constrained based on the structural constraints of the trunk and limbs of a human body. Thus, the state transition of the skeleton model in the state space can be reliably and rationally constrained. The imposition of such constraints improves the reliability of tracking, enabling a robust pedestrian tracking.

Further, since a distance-transformed image obtained by transforming a binary image of a pedestrian region is used as a comparison for calculating the likelihood, it is possible to calculate the likelihood more accurately. More specifically, the distance-transformed image of the pedestrian region reflects the state of the limbs of the pedestrian which appear on the outer shape of the pedestrian region, and thus is suitable as observed data to be compared with the skeleton model, making it possible to calculate the likelihood with high accuracy. Further, since a binarized image is used, it is not necessary to use color information of the image, enabling an accurate and robust pedestrian tracking even when applied to pedestrian tracking for surveillance e.g. using infrared images at night.

According to the present invention, it is preferable in the improved invention described above that the skeleton model is built of eight sticks consisting of: a trunk stick; a shoulder stick intersecting and connected to an upper end of the trunk stick; a waist stick intersecting and connected to a lower end of the trunk stick; a head stick as an extension of the trunk stick; and four limb sticks connected to both ends of the waist stick and the shoulder stick, respectively.

According to such structure, it is possible to easily build a skeleton model properly reflecting the characteristic structure of a human body. Further, an appropriate, not excessive, number can be selected as a number of variables representing a state of the skeleton model, so that the number of state variables can be reduced, making it possible to reduce the number of transitional states, and thus to increase the tracking accuracy.

According to the present invention, it is preferable in the improved invention as described above that the skeleton model can have a state with zero length of the shoulder and waist sticks, a state with zero length of the shoulder, waist and both hand sticks, and a state with zero length of the shoulder and both hand sticks.

According to such a structure, a skeleton model can be selected by reflecting the moving direction of the pedestrian appearing in the images. For example, a pedestrian moving left or right in the images is walking, showing one side of the body, with the shoulder width or the waist width being hardly recognized. Thus, the skeleton model with zero length of the shoulder stick and the waist stick is suitably used.

According to the present invention, it is preferable in the improved invention as described above that a state of the skeleton model is determined by positions and angles of the respective sticks, which build the skeleton model, and is constrained so that mutual spatial arrangement of the sticks is a spatial distribution which is possible in human body structure.

According to such a structure, the mutual spatial arrangement of the mutually connected sticks is constrained by the positions and angles of the respective sticks so as to be a spatial distribution which is possible in human body structure. Thus, it is possible to constrain the state transition of the skeleton model by constraining and preventing the changes in the appearance of a pedestrian from being unnatural.

According to the present invention, it is preferable in the improved invention as described above that the distance-transformed image used in the step of likelihood calculation is an image represented by a black and white density such that its intensity increases as its position shifts from a black contour part representing the pedestrian region to the inside of the contour, wherein the likelihood of the predicted skeleton model is calculated, with the distance-transformed image being superimposed on the skeleton model, by using a distance from each of the multiple points on the sticks building the skeleton model to a maximum intensity point of the distance-transformed image present on a normal of each stick at the each point.

According to such a structure, the likelihood of each estimated skeleton model can be calculated with high accuracy, because both the sticks of the skeleton model and the high intensity portions of the distance-transformed image reflect the bone structure of a human body, and the degree of their superimposition can be estimated by the distance to the maximum intensity point. For example, as the sum of the distances to the maximum intensity points decreases, the degree of superimposition increases, increasing the likelihood.

According to the present invention, it is preferable in the improved invention as described above that random numbers are used in the step of predicting the set of particles and the step of setting the new set of particles, and the random numbers are generated using a pseudo-random number generation algorithm.

According to such a structure, the random numbers generated using a pseudo-random number generation algorithm have characteristics of long-period and high dimensional uniform distribution, and thus are suitable for a Monte Carlo filter, making it possible to achieve highly accurate pedestrian tracking.

According to the present invention, it is preferable in the improved invention as described above that the pedestrian tracking method further comprises a step of calculating a variance of coordinates of a node between trunk stick and head stick, and ending the tracking if such variance exceeds a certain value.

According to such a structure, it is possible to determine from the variance of the coordinates of the node that even if a non-pedestrian is erroneously extracted as a pedestrian region, the tracking target is not a pedestrian, and thus to end the mistracking.

Further, the present invention provides a pedestrian tracking device comprising: image receiving means for receiving, in time series, images captured continuously in time; pedestrian region selecting means for sampling candidate pedestrian regions from an image received by the image receiving means, and classifying the sampled candidate pedestrian regions into pedestrian regions and non-pedestrian regions, and for selecting a certain pedestrian region; tracking means provided in time series with the pedestrian region selected by the pedestrian region selecting means for predicting motion of the pedestrian region by use of the pedestrian tracking method according to any one of claims 1 to 7 so as to track the pedestrian region; and pedestrian trajectory display means for displaying, in time series, the pedestrian region tracked by the tracking means.

According to such a structure, it is possible to achieve a robust pedestrian tracking with a simple structure for predicting the motion of a pedestrian in images without using color information even in situations such as presence of occlusion to cause a pedestrian to be temporarily hidden behind, sudden change in velocity of a pedestrian, presence of multiple objects similar to the pedestrian of interest, and so on, making

BRIEF DESCRIPTION OF DRAWINGS

FIG. 6 is a conceptual explanatory view of a pedestrian tracking based on a Monte Carlo filter in the pedestrian tracking method;

FIGS. 7A1, 7A2 and 7A3 are views showing examples of images of pedestrian regions to be processed by the pedestrian tracking method, and FIGS. 7B1, 7B2 and 7B3 are views showing morphological skeletons obtained from the images of the pedestrian regions, while FIGS. 7C1, 7C2 and 7C3 are views in which the concept of limbs is reflected in morphological skeleton;

FIG. 11A is a view of a pedestrian region as a target to be tracked in the pedestrian tracking method, while

FIG. 12A is a view in which a predicted skeleton model is superimposed on a distance-transformed image in the pedestrian tracking method, while

FIGS. 20A, 20B and 20C are views showing a part of actual image sequences used for the evaluation of the pedestrian tracking method, while

FIG. 21A is a graph showing evaluation results of center-of-gravity errors for sequence N, while

FIG. 22A is a graph showing evaluation results of the center-of-gravity errors for sequence R, while

FIG. 23A is a graph showing evaluation results of the center-of-gravity errors for sequence G1, while

FIG. 24A is a graph showing evaluation results of the center-of-gravity errors for sequence G2, while

FIG. 25A is a graph showing evaluation results of the center-of-gravity errors for sequence P1, while

FIG. 26A is a graph showing evaluation results of the center-of-gravity errors for sequence P2, while

FIG. 27A is a graph showing evaluation results of the center-of-gravity errors for sequence P3, while

FIG. 28A is a graph showing evaluation results of the center-of-gravity errors for sequence C1, while

FIG. 29A is a graph showing evaluation results of the center-of-gravity errors for sequence C2, while

FIG. 30A is a graph showing evaluation results of the center-of-gravity errors for sequence C3, while FIG. 30B is a graph showing evaluation results of the scale errors therefor;

FIG. 31A is a graph showing evaluation results of the center-of-gravity errors for sequence C4, while FIG. 31B is a graph showing evaluation results of the scale errors therefor;

FIG. 32A is a graph showing evaluation results of the center-of-gravity errors for sequence U, while FIG. 32B is a graph showing evaluation results of the scale errors therefor;

FIG. 33A is a graph showing evaluation results of the center-of-gravity errors for sequence S1, while

FIG. 35A is a graph showing evaluation results of the center-of-gravity errors for sequence S2, while

FIG. 36A is a graph showing an example of a probability density distribution assumed in the pedestrian tracking, while

FIG. 37A is a graph showing an example of a probability density distributed assumed in the pedestrian tracking, while

BEST MODE FOR CARRYING OUT THE INVENTION

Hereinafter, a pedestrian tracking device and a pedestrian tracking method according to an embodiment of the present invention will be described with reference to the drawings.

(Pedestrian Tracking Device)

Figure 1:
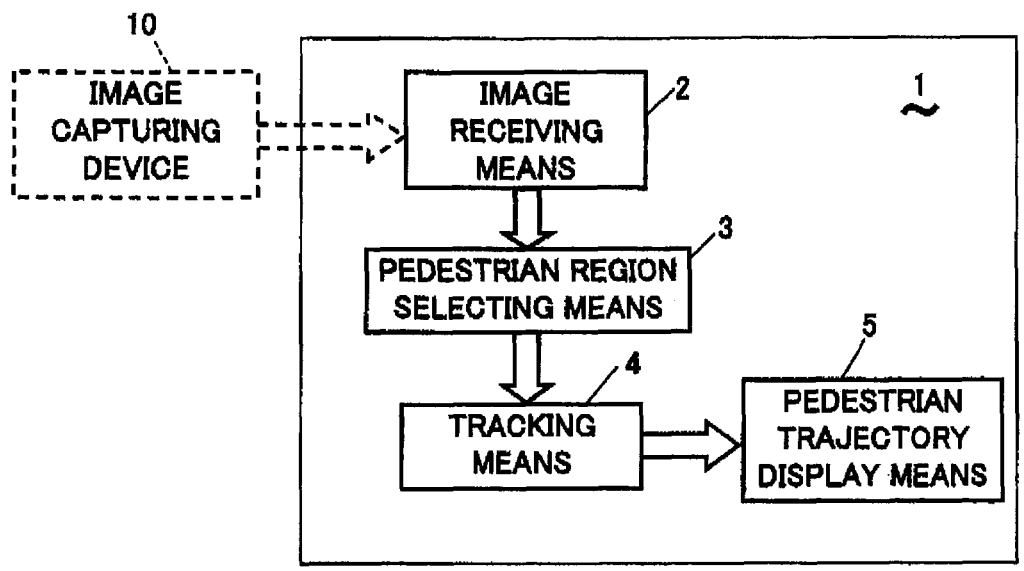
FIG. 1 is a block diagram of a pedestrian tracking device according to an embodiment of the present invention.
Figure 2:
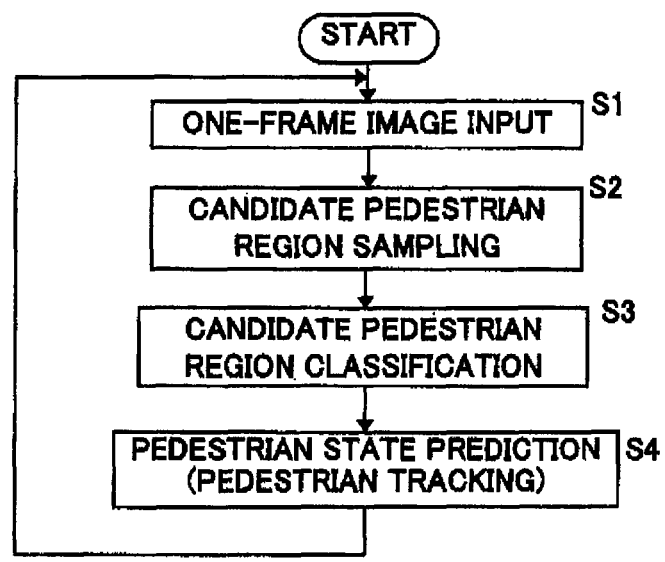
FIG. 2 is a flow chart of a pedestrian tracking process in the device.

FIG. 1 shows a block diagram of a pedestrian tracking device 1 according to an embodiment of the present invention, while FIG. 2 shows a process flow in the pedestrian tracking device 1. The pedestrian tracking device 1 comprises: an image receiving means 2 for receiving, in time series, images captured continuously in time by an image capturing device 10; a pedestrian region selecting means 3 for sampling candidate pedestrian regions from an image received by the image receiving means 2 and classifying the sampled candidate pedestrian regions into pedestrian regions and non-pedestrian regions, and for selecting a certain pedestrian region; a tracking means 4 provided in time series with the pedestrian region selected by the pedestrian region selecting means 3 for predicting motion of the pedestrian region and associating it with time direction by use of a skeleton model obtained by modeling a pedestrian, a distance-transformed image obtained from the pedestrian region and a Monte Carlo filter so as to track the pedestrian region; and a pedestrian trajectory display means 5 for displaying, in time series, the pedestrian region tracked by the tracking means 4.

The process in the above-described pedestrian tracking device 1 comprises four major process elements: one-frame image input (S1) by the image receiving means 2; candidate pedestrian region sampling (S2) by the pedestrian region selecting means 3; candidate region classification (S3) by the same pedestrian region selecting means 3; and pedestrian state prediction (pedestrian tracking) (S4) by the tracking means 4.

The above-described image capturing device 10 e.g. uses a television camera using an image sensor and so on. The image receiving means 2 receives an image input from the image capturing device 10, and subjects the image to proper preprocesses such as noise removal and contour emphasis, and inputs the processed image to the pedestrian region selecting means 3.

The pedestrian region selecting means 3 subjects the input image to processes such as background subtraction method, optical flow detection, three-dimensional distance measurement by stereo matching, flesh color detection, face contour detection and so on, and then samples candidate pedestrian regions from the image which are assumed to be image portions showing an entire body image of the pedestrian. The sampled candidate pedestrian regions usually include many misdetected regions. Thus, the pedestrian selecting means 3 classifies the sampled candidate regions into pedestrian regions and non-pedestrian regions. This classification is performed, for example, by machine learning based on neural network, support vector machine or boosting, and by a process based on a feature of an image as obtained by Haar transform, Gabor transform or the like.

The tracking means 4 performs tracking which, based on the pedestrian regions classified as pedestrians, associates a pedestrian region with time direction. More specifically, the above-described sampling and classification of candidate pedestrian regions by the pedestrian region selecting means is generally performed for each frame, namely, independently for each image, so that none of the pedestrian regions in this process is associated with, or can be associated with the time direction. Thus, the tracking means 4 associates a pedestrian region with the time direction. This process by the tracking means 4 is performed based on a pedestrian tracking method described later.

The main purpose of the pedestrian tracking by the tracking means 4 is to estimate information of pedestrian motion, and associate a pedestrian region with time direction. The pedestrian tracking makes it possible to estimate the pedestrian motion in the case where a pedestrian cannot be detected from one image, for example, due to an effect of the so-called occlusion in which a pedestrian overlaps another object, preventing image information of the pedestrian from being obtained. Information obtained by the pedestrian tracking can be used e.g. in a process for detecting collision of a camera-equipped car with a pedestrian, and a process for identifying and tracking a certain pedestrian in a situation where there are many pedestrians present.

(Outline of Pedestrian Tracking Method)

Figure 3:
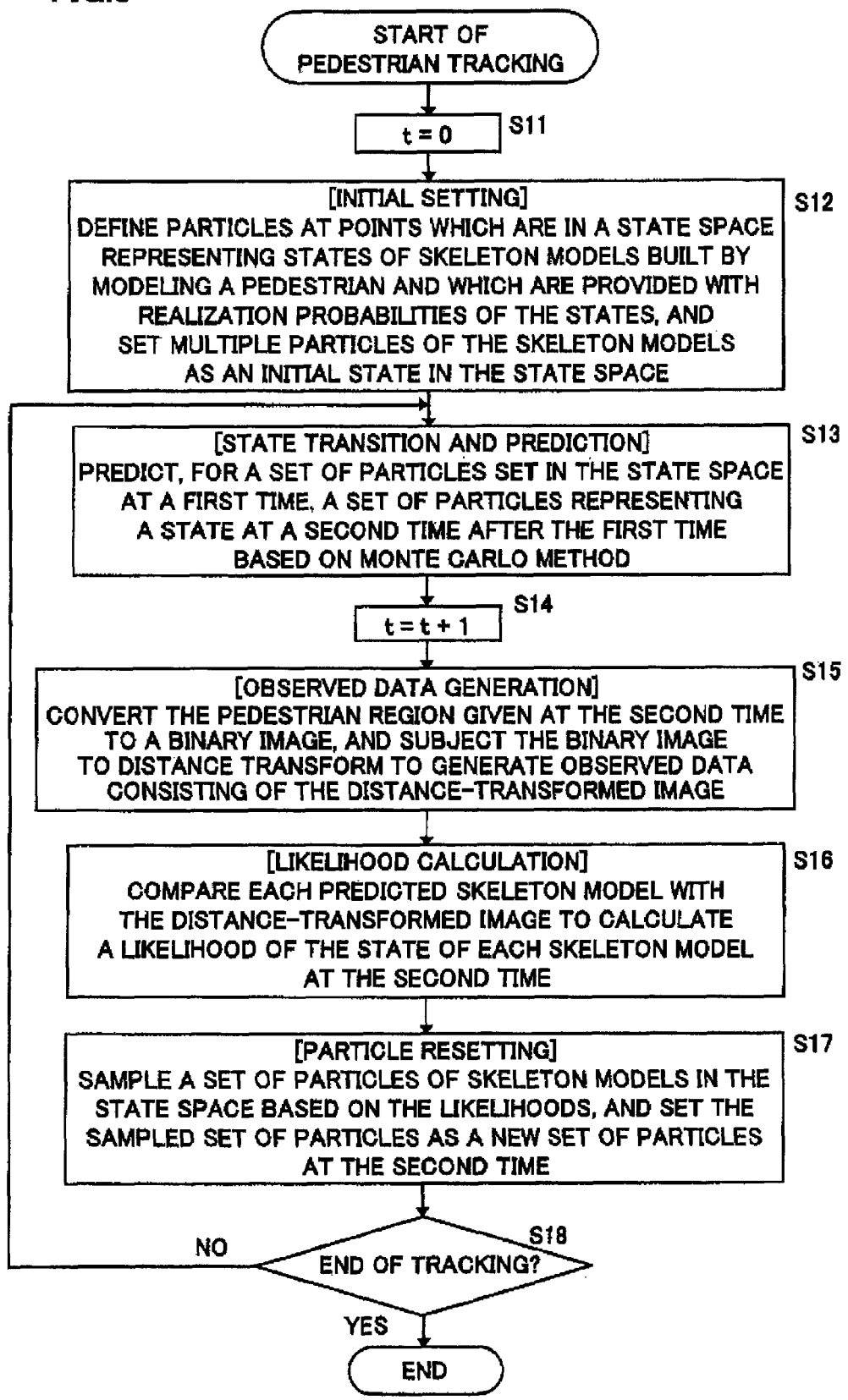
FIG. 3 is a flow chart of a process in a pedestrian tracking method according to an embodiment of the present invention.
Figure 4:
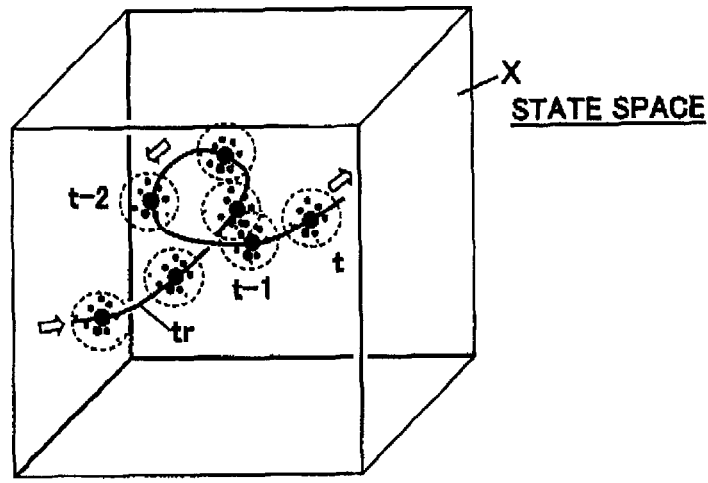
FIG. 4 is conceptual explanatory view of a state space used in the pedestrian tracking method.
Figure 5:
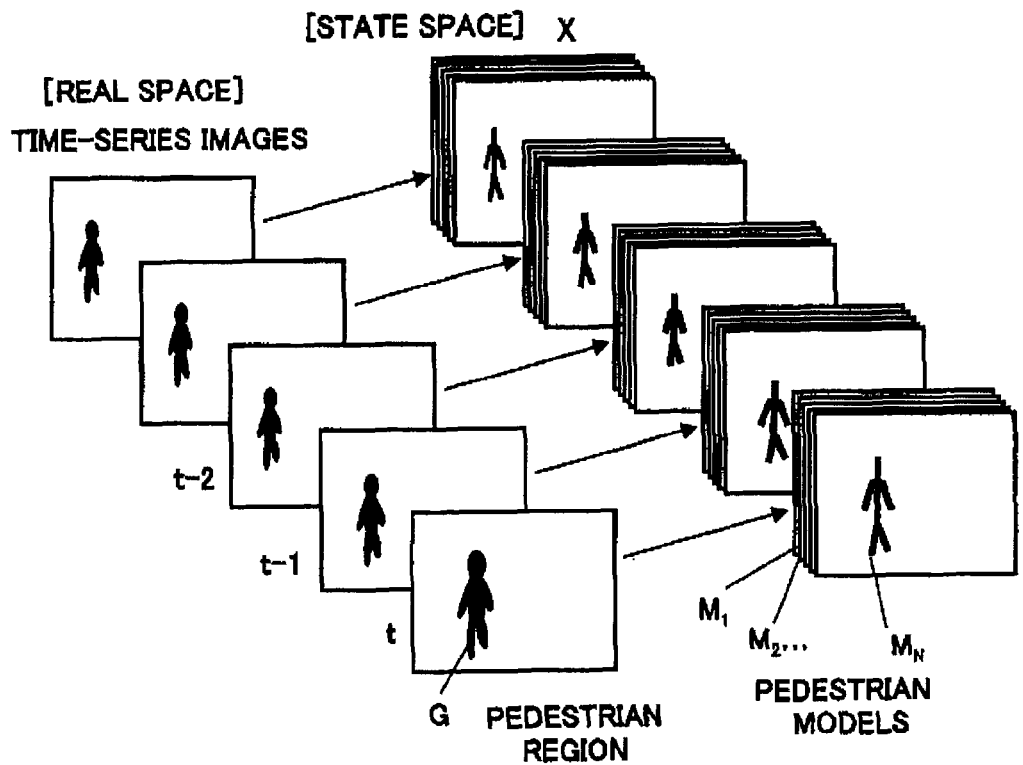
FIG. 5 is an explanatory view of a relation between images and pedestrian models in the pedestrian tracking method.

FIG. 3 shows a flow chart of a process in a pedestrian tracking method according to an embodiment of the present invention, and FIG. 4 shows a state space X used in the pedestrian tracking method, while FIG. 5 shows a relation between images and pedestrian models in the pedestrian tracking method. The pedestrian tracking method is a method provided in time series with a certain pedestrian region each appearing in images captured continuously in time for predicting motion of the pedestrian region and associating the motion of the pedestrian region with time direction by use of a Monte Carlo filter so as to track the pedestrian region. This method is performed by the tracking means 4 in the above-described pedestrian tracking device 1.

As shown in FIG. 3, the pedestrian tracking method comprises an initial setting step (S12), a state transition and prediction step (S13), an observed data generation step (S15), a likelihood calculation step (S16), a particle resetting step (S17) and so on.

First, a time variable t is initialized (t=0) in step S1, and then the initial setting step (S12) is performed.

The initial setting step (S12) is a step of: building skeleton models each of a pedestrian with multiple nodes and multiple sticks connecting the nodes; defining, in a state space X of a multidimensional space representing points in one-to-one correspondence with states of skeleton models, particles at the points provided with realization probability attributes of states represented by the points of the state space X; and setting multiple particles of skeleton models as an initial state in the state space X.

The state transition and prediction step (S13) is a step to predict, for a set of particles set in the state space X at a first time, a set of particles representing a state at a second time after the first time using Monte Carlo filter method. After this step, the time variable t is advanced by one, namely t=t+1 (increment).

The observed data generation step (S15) is a step of converting a pedestrian region given at the second time to a binary image, and subjecting the binary image to distance transform so as to generate observed data comprised of the distance-transformed image.

The likelihood calculation step (S16) is a step of comparing each predicted skeleton model with the distance-transformed image (observed data) provided using distance transform so as to calculate a likelihood of the state of each skeleton model at the second time.

The particle resetting step (S17) is a step of sampling a set of particles of skeleton models in the state space X based on the likelihoods of the respective skeleton models, and setting the sampled set of particles as a new set of particles in the state space X at the second time.

The pedestrian tracking is achieved by performing, at each time increment, the steps from the above-described step (S13) of predicting the set of particles to the step (S17) of setting the sampled set of particles as the new set of particles. In other words, the above-described respective steps predict the motion of the particles of the skeleton models in the state space and associate it with time direction, so as to track the pedestrian region, thus performing tracking.

(Probabilistic Tracking)

The above-described steps S13, S15 and S16 are based on the so-called CONDENSATION framework for probabilistically tracking a pedestrian by using a Monte Carlo filter. This framework (method) is effective for pedestrian tracking in a situation of disordered and complex background image or image of a pedestrian itself, if the state space X is properly set, that is, setting a proper pedestrian model, setting a proper state transition model and proper setting for constraining the state transition. In other words, this enables robust tracking which is robust to occlusion of a target object or pedestrian, sudden change in velocity of the pedestrian, and so on.

Figure 37A:
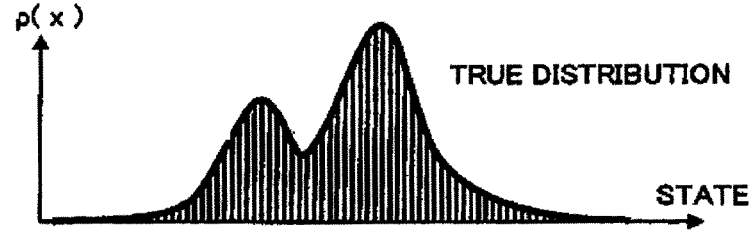
Figure 37B:
FIG. 37B is a distribution chart showing an expression example of the probability distribution in a Monte Carlo filter.
Figure 38:
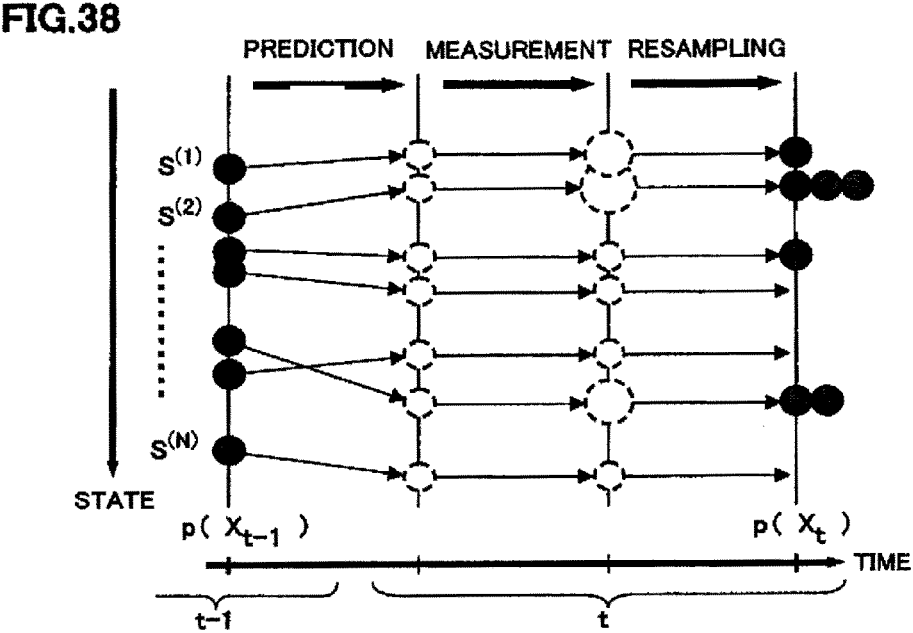
FIG. 38 is a conceptual explanatory view of state prediction in the Monte Carlo filter.
Figure 39A:
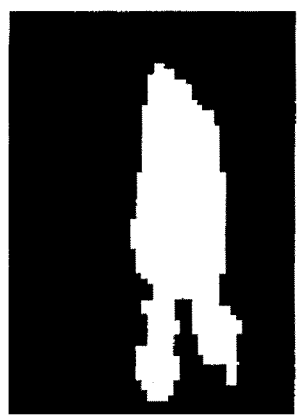
FIGS. 39A, 39B and 39C are views showing images of pedestrian regions as a target of the pedestrian tracking.
Figure 39B:
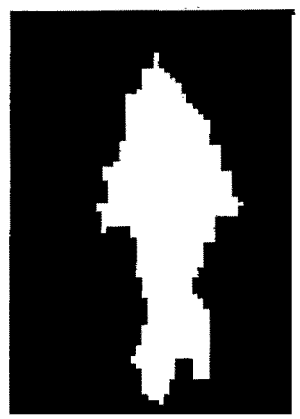
Figure 39C:
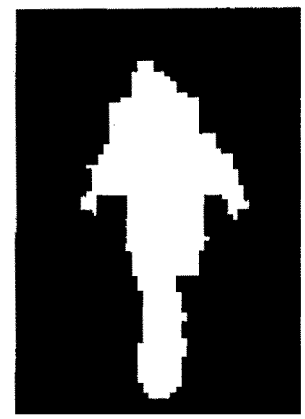

Referring to FIG. 4, the pedestrian tracking using a Monte Carlo filter corresponds to probabilistically finding a trajectory tr of a point which represents a pedestrian model in the state space X and moves (state transition) with time t. The points representing a pedestrian model in the state space X at each time t are distributed according to a probabilistic distribution, in which the trajectory tr connecting, in time, points with the highest probability of presence is the tracking result. Thus, referring to FIG. 5, an image G of a pedestrian region in real space corresponds to particles in the state space X which represent pedestrian models $M_1, M_2, \ldots M_N$ (refer to FIGS. 37A, 37B, 38 and the description of these Figures in the Background Art).

An increase in the number of pedestrian models N, i.e. the number of particles N representing the state probability distribution, causes an increase in the calculation amount, but can increase the approximation accuracy. In other words, it is possible to easily satisfy system requirements such as accuracy by selecting a proper number N according to the application.

(Use of Skeleton)

A change with time of the skeleton (bone structure) of a pedestrian used as a pedestrian model is more stable than the contour of the pedestrian, showing a stable state transition in time direction. Thus, the state space X based on the skeleton is a proper setting for the pedestrian tracking. In other words, the use of a skeleton increases the likelihood that the next state predicted from the current state is close to the true value, enabling highly accurate pedestrian tracking.

(Constraint on State Transition)

If a target to be tracked is restricted to a pedestrian, accurate pedestrian tracking can be achieved without pre-learning the target by expressing the pedestrian using a skeleton and by constraining the state transition. For example, it is considered that a skeleton causing a stick representing a leg to intersect a stick representing the neck occurs with an extremely low occurrence probability. A prediction of state closer to a true value can be achieved by removing states with a low occurrence probability from the destination of the state transition. More specifically, this can be done by constraining the state transition such that among possible states of the skeleton model when simply connecting the nodes and the sticks, those states with a low occurrence probability are removed in advance from the destination of the state transition. This shows that when using the skeleton, it is possible to more properly and more effectively constrain the state transition than when using the contour.

(Calculation of Likelihood Using Distance-Transformed Image)

As described in the Background Art, the contour tracking using CONDENSATION is based on model curve (B-spline curve) of the contour and the contour edge of an image so as to calculate the likelihood of model curve particles in a state space. In the above-described steps S15 and S16, this concept is applied to the pedestrian tracking (in which the skeleton corresponds to the contour, and the distance-transformed image corresponds to the contour edge). A binary image having a candidate pedestrian region in white is distance-transformed, and the image generated thereby is used as observed data $y_t$ to be input to a Monte Carlo filter.

(Random Number Generation)

A pseudo-random number generation algorithm (Mersenne Twister: introduced by Makoto Matsumoto and Takuji Nishimura in 1997) is used to generate random numbers used in the above-described state transition and prediction step S13 and the step S17 for resampling and setting a new set of particles. The random numbers generated thereby have characteristics of long-period and high dimensional uniform distribution, and are random numbers suitable for a Monte Carlo filter, making it possible to achieve highly accurate pedestrian tracking.

(Process Flow of Pedestrian Tracking)

A process flow of pedestrian tracking using a Monte Carlo filter is summarized below, including mathematical expressions. FIG. 6 shows a concept of pedestrian tracking based on the Monte Carlo filter in the pedestrian tracking method, and corresponds to FIG. 38 described in the Background Art.

First, a state probability distribution $p(x_0)$ is generated by adding noise to a given initial state vector $x_0$ (S12 in FIG. 3). Next, a Monte Carlo filter is used at time t (t=1, 2, . . . ) to estimate $p(x_t)$ from $p(x_{t-1})$. The prediction is achieved by repeating the three steps of prediction, measurement and resampling.

(Prediction) A state transition is performed by using a skeleton model and constraining the state transition. For respective particles $s_{t-1}^{(n)}$ (n=1, . . . ,N), the next state $s'_t^{(n)}$ is predicted according to the process probability density $p(x_t|x_{t-1}=s_{t-1}^{(n)})$ (S13 in FIG. 3).

(Measurement) The likelihood of each predicted particle is calculated by comparing each particle with distance-transformed image. More specifically, for each particle, the likelihood $\pi_t^{(n)}$ of the predicted state is calculated according to the observation probability density $p(y_t|x_t)$ (S15, S16 in FIG. 3). Here, $y_t$ is an observation vector (observed data, i.e. vector in observation space representing distance-transformed image) at time t.

(Resampling) Random numbers are generated, and the generated random numbers are used to determine a likelihood so as to sample, based on inequality (5) and equation (6) described in the Background Art, a predicted state from the next state $s'_t^{(n)}$ predicted as above. By repeating it N times, which is the number of particles, a set of particles $\{s_t^{(n)}, n=1, \ldots, N\}$ at time t is sampled, and is set as a set of particles at time t (S17 in FIG. 3). Based on these processes, the state probability distribution $p(x_t)$ at each time t (t=1, 2, . . . ) is finally obtained. Based on the obtained state probability distribution at each time, a trajectory tr in the state space X is determined as shown in FIG. 4 described above. This is the tracking result.

As described above, the likelihood of each particle representing the predicted state is used to allocate a larger number of particles at locations of particles with a higher likelihood, and allocate a smaller number, or none, of particles at locations of particles with a lower likelihood so as to resample the N particles in the state space and redistributes (resets) these particles, whereby the state probability distribution $p(x_t)$ at each time t (t=1, 2, . . . ) reflecting the correction by the observed data is determined.

The pedestrian tracking method according to the embodiment of the present invention uses a Monte Carlo filter and a skeleton model as a model of a pedestrian. Thus, it is possible to achieve more robust tracking, following changes with time of the shape of a pedestrian region in an image, than when using a contour model of the pedestrian. More specifically, the skeleton model can model the trunk and limbs of the pedestrian, so that in contrast to the use of contour, the changes of the shape of the skeleton model can be constrained based on the structural constraints of the trunk and limbs of a human body. Thus, the state transition of the skeleton model in the state space can be reliably and rationally constrained. The imposition of such constraints improves the reliability of tracking, enabling a robust pedestrian tracking.

Further, since a distance-transformed image obtained by transforming a binary image of a pedestrian region is used as a comparison for calculating the likelihood, it is possible to calculate the likelihood more accurately. More specifically, the distance-transformed image of the pedestrian region reflects the state of the limbs of the pedestrian which appear on the outer shape of the pedestrian region, and thus is suitable as observed data to be compared with the skeleton model, making it possible to calculate the likelihood with high accuracy. Further, since this pedestrian tracking method uses a binarized image, it is not necessary to use color information of the image, enabling an accurate and robust pedestrian tracking when applied to pedestrian tracking for surveillance e.g. using infrared images at night.

Hereinafter, the individual element technologies and processes in the pedestrian tracking method, i.e. skeleton model, state space X, state transition model and calculation method of likelihood $\pi_t^{(n)}$, will be described in detail.

(Validity of Skeleton Model of Pedestrian)

FIGS. 7A1 to 7A3 show examples of images of pedestrian regions to be processed by the pedestrian tracking method, and FIGS. 7B1 to 7B3 show morphological skeletons obtained from the images, while FIGS. 7C1 to 7C3 show states in which the concept of limbs is reflected in the morphological skeletons. Here, examples of morphological skeletons as so-called morphological images, which are obtained by subjecting the images of pedestrian regions to image processing, are shown to explain the validity of modeling a pedestrian using sticks.

A morphological skeleton of a pedestrian is obtained by the following process. Assume that $I_b$ is a discrete binary image (FIGS. 7A1 to 7A3), and P is a binary pattern containing the origin (0,0). Now, consideration is given by fixing P. Assuming $M=\max\{i \geq 0; I_b \ominus iP \neq \phi\}$, each $S_i$ defined by $S_i = (I_b \ominus iP) - (I_b \ominus iP) \Diamond P$ is referred to as a skeleton element. Here, $A \ominus B$ is an erosion of A by B, and $A \Diamond B$ represents an opening of A by B, while $(A \ominus kB)$ represents an erosion repeated k time as defined by the following equation: $(A \ominus kB) = ( \ldots (A \ominus B) \ominus B \ominus \ldots ) \ominus B$.

A morphological skeleton $SK(I_b)$ is defined as a union of all $S_i$ as in the following equation (8). Thus, the morphological skeleton $SK(I_b)$ as shown in FIGS. 7B1 to 7B3 is uniquely obtained from each binary image.

$$SK(I_b) = \bigcup_{i=0}^{M} S_i \quad (8)$$

When the knowledge that the skeleton of a pedestrian has "four branches at the neck position" and "three branches at the waist position" is applied to the above-described morphological skeleton $SK(I_b)$, the state of the bone structure of the pedestrian becomes clearer as shown in FIGS. 7C1 to 7C3. Conversely, it is possible to stably predict changes in the state of the pedestrian between the images by considering the bone structure of a human.

It is seen from the above that the state transition of the skeleton model enables easier prediction than the state transition of the pedestrian contour. More specifically, the state transition of a skeleton is more stable in time direction than the state transition of a contour, so that the predicted next state is closer to a true value. Thus, a more robust pedestrian tracking can be achieved by using, as state space X, a space consisting of parameters representing a skeleton model of a pedestrian.

(Skeleton Model Building)

FIGS. 8A to 8D show skeleton models used in the pedestrian tracking method. As the precision of modeling a bone structure of a pedestrian is increased, finer elements can be considered in the likelihood calculation, so that the accuracy of the likelihood calculation can be expected to increase. However, an excessive precision causes an increase in the number of parameters for the state expression which in turn increases the degree of freedom in the state transition, resulting in a decrease in the percentage of particles which transition to a state closer to the true value. In other words, the accuracy of likelihood calculation and the accuracy of state transition are in a trade-off relationship.

Figure 8A:
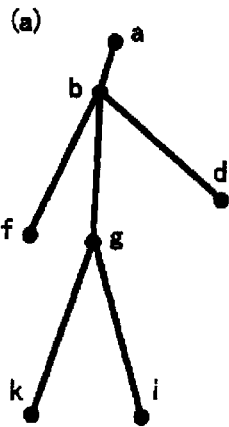
FIGS. 8A to 8D are views of skeleton models used in the pedestrian tracking method.
Figure 8B:
Figure 8C:
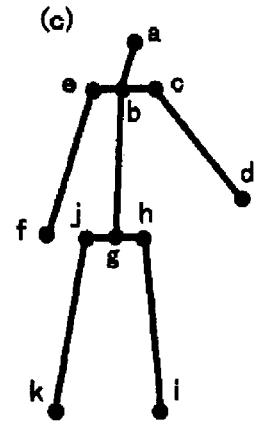
Figure 8D:
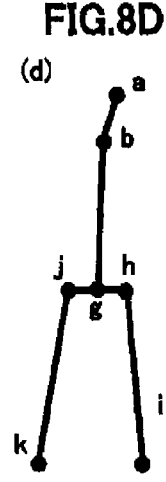

Thus, as shown in FIG. 8C, in the pedestrian tracking method according to the present embodiment, a skeleton model is built by eight sticks consisting of: a trunk stick; a shoulder stick intersecting and connected to an upper end of the trunk stick; a waist stick intersecting and connected to a lower end of the trunk stick; a head stick as an extension of the trunk stick; and four limb sticks connected to both ends of the waist stick and the shoulder stick, respectively.

The skeleton model of a pedestrian using eight sticks as shown in FIG. 8C described above makes it possible to easily build a skeleton model properly reflecting the characteristic structure of a human body. Further, an appropriate, not excessive, number can be selected as a number of variables representing a state of the skeleton model, so that the number of state variables can be reduced, making it possible to reduce the number of transitional states, and thus to increase the tracking accuracy.

In addition, it is set that the state of the skeleton model is further restricted so that it can have a state as shown in FIG. 8A with zero length of the shoulder and waist sticks, a state as shown in FIG. 8B with zero length of the shoulder, waist and both hand sticks, and a state as shown in FIG. 8C with zero length of the shoulder and both hand sticks.

The skeleton model with the above-described restriction suppresses an increase in the degree of freedom in the state transition, and reflects the moving direction of the pedestrian appearing in the images. For example, a pedestrian moving left or right in the images is walking, showing one side of the body, with the shoulder width or the waist width being hardly recognized. Thus, the skeleton model with zero length of the shoulder stick and the waist stick is suitably used. Note that in the following, the multiple nodes and the multiple sticks connecting the nodes, which build a skeleton model, are each expressed by stick $ST_{pq}$ connecting node p and node q.

When expressing a pedestrian by sticks as described above, a skeleton model as shown in FIG. 8A, which is built of six sticks representing the limbs, waist and head, can be considered. This is referred to as skeleton model (a). When detecting pedestrian regions from actually captured images, it may occur that hand regions are not detected if the resolution is low, or a hand overlaps the trunk. In this case, the skeleton model (a) makes it impossible to properly calculate elements originating from $ST_{bd}$ and $ST_{bf}$ at the time of the likelihood calculation, thereby lowering the accuracy of the likelihood calculation.

Thus, a skeleton model (b) as shown in FIG. 8B is set which is built of four sticks by removing $ST_{bd}$ and $ST_{bf}$ from the skeleton model. This makes it possible to reduce the degree of freedom as compared with the skeleton model (a), and increases the accuracy of the likelihood calculation in a situation that the hands are not detected. This means that either one of the skeleton models can be selectively used, depending on the situation, for example, whether the hand (arm) regions are detected. Further, when the pedestrian is showing its side in the images, that is walking left or right, the shoulder width is hardly recognized, so that the skeleton models (a) and (b) make it possible to obtain sufficient calculation accuracy.

Now, when the pedestrian is showing its front or back in the images, that is walking up or down, or in the front direction, the shoulder width and the waist width are recognized. Specifically, this causes the node b of the arm stick and the node g of the leg stick to be respectively offset by the width of the trunk, causing the likelihood calculated using the skeleton models (a) and (b) to contain a large error. Thus, shoulder stick $ST_{ce}$ and waist stick $ST_{hj}$ are added to the skeleton models (a) and (b), respectively, to build skeleton models (c) and (d). By using such models, the calculation accuracy can be increased.

As described above, an optimum model in the skeleton models (a) to (d) depends on the characteristics of the image sequence (hereafter referred to as sequence) which is a target of the pedestrian tracking. Thus, by appropriately selecting a model from these skeleton models (a) to (d) according to the orientation or the moving direction of a pedestrian in the images, a highly accurate pedestrian tracking can be achieved. Such model is referred to here as an adaptive skeleton model, and will be described in the Examples.

(Setting of State Space X)

Figure 9:
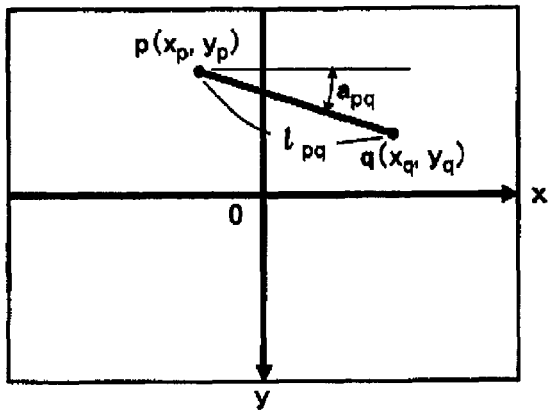
FIG. 9 is a view of a coordinate system for defining stick coordinates of a skeleton model used in the pedestrian tracking method.

Next, state space X to describe the states of the skeleton models described above will be described. FIG. 9 shows a coordinate system for defining stick coordinates of a skeleton model used in the pedestrian tracking method.

The state space X is a multidimensional space represented by vectors each formed by characteristic points of a pedestrian, and is defined based on variables (parameters) representing a skeleton model obtained by modeling the pedestrian using a skeleton. It is desirable that the state space X is based on a model with appropriate degree of freedom, not too high and not too low, in order to accurately predict the state transition. Thus, the state space X is set for the four patterns of skeleton models (a) to (d) built of four to eight sticks as described above.

In order to represent the shape of a skeleton model by coordinates, an image coordinate system fixed to the time-series images as targets for pedestrian tracking is used as an absolute coordinate system. A state of a pedestrian occupies a point in the state space X based on a set of values of parameters (variables) representing the respective sticks.

Thus, each of the skeleton models (a) to (d) is expressed by parameters so as to make a state of the pedestrian correspond to a point in the state space X. An xy coordinate system as an image coordinate system (absolution coordinate system) is set as shown in FIG. 9, in which the coordinate of a node p (p=a,b, . . . ) in the xy coordinate system is set as $(x_p,y_p)$. Several methods can be considered as methods of expressing a skeleton model in the state space X. For example, as in state space $X_{abs}$ represented by the following equation (9), the state space X can be defined by using the absolute coordinates, as is, of the respective nodes of a skeleton. Here, the capital letter X represents state space, and the equal sign with three lines indicates that the equation is a defining equation, while the parentheses { } represents a vector with the variables (parameters) in the parentheses as components, and the superscript T of the parentheses { } denotes transposition of vector or matrix:

$$X_{abs} \equiv \{x_a, y_a, x_b, y_b, \ldots\}^T \quad (9)$$

However, the state space expressed by the above equation (9) is inconvenient for easy removal of impossible states of a skeleton of the pedestrian which include, for example, a state in which the head and the trunk move in separate directions. Thus, a single point of the nodes with absolute coordinates is specified, and this point is set as a reference point (base point) so as to express the other nodes by relative coordinates from the base point. As shown in the following equations (10) to (12), the relative coordinates are expressed by a rectangular image coordinate system using the base point as the origin. Here, $(x_{base}, y_{base})$ are absolute coordinates of the base point, while $x_p', y_p'$ are relative coordinates of node p given by equations (11) and (12), respectively. The space represented by such coordinate system is defined as $X_{rel}$:

$$X_{rel} \equiv \{x_{base}, y_{base}, x_a', y_a', x_b', y_b', \ldots\}^T \quad (10)$$

$$x_p' = x_p - x_{base} \quad (11)$$

$$y_p' = y_p - y_{base} \quad (12)$$

By using the state space $X_{rel}$, it becomes easy to individually adjust the noise variance to control transition of the relative coordinates and the noise variance to control transition of the absolute coordinates at the time of the state transition, making it possible to easily restrict the above-described possibility of motions of the head and the trunk in separate directions.

The state space $X_{rel}$ according to the above-described equation (10) is further improved to define state equation $X_{pol}$ using a relative coordinate system based on the lengths and angles of the respective sticks. This is based on the principle that when the position of the node g of the waist is fixed, the position of the toe of a leg is likely to be on the circumference of a circle with a center at the waist and a radius equal to the length of the leg. The state equation $X_{pol}$ can easily express constraints on the state transition. The state equation $X_{pol}$ can be expressed by the following equation (13). Here, the length $l_{pq}$ and angle $a_{pq}$ are defined by equations (14) and (15), respectively, as shown in FIG. 9.

$$X_{pol} \equiv \{x_{base}, y_{base}, l_{ab}, l_{bg}, \ldots, a_{ab}, a_{bg}, \ldots\}^T \quad (13)$$

where $l_{bd} = l_{bf}$     [Skeleton model (a)]

$l_{gi} = l_{gk}$     [Skeleton model (a), (b)]

$l_{cd} = l_{ef}$     [Skeleton model (c)]

$l_{hi} = l_{jk}$     [Skeleton model (c), (d)]

$l_{ce} = l_{hj}$     [Skeleton model (c)]

$a_{ce} = a_{jn} = 0$     [skeleton model (c), (d)]

$$l_{pq} = \sqrt{(x_p - x_q)^2 + (y_p - y_q)^2} \quad (14)$$

$$a_{pq} = \tan^{-1} \frac{y_p - y_q}{x_p - x_q} \quad (15)$$

In the above, the state spaces $X_{abs}$, $X_{rel}$ and $X_{pol}$ according to the three expressions have been described. Hereinafter, a description will be given using the state space $X_{pol}$ with the node b of the neck as a base point. Assuming the use of the state space $X_{pol}$, state space $X_{(i)}$, (i=a,b,c,d), which corresponds to each of the four skeleton models (a) to (d), can be expressed by the following equations (16), (17), (18) and (19). The numbers of dimensions of the state spaces are twelve dimensions, nine dimensions, fourteen dimensions and ten dimensions, respectively. The number of dimensions corresponds to the degree of freedom in the state transition.

$$X_{(a)} \equiv \{x_b, y_b, l_{ab}, l_{bd}, l_{bg}, l_{gi}, a_{ba}, a_{bd}, a_{bf}, a_{bg}, a_{gi}, a_{gk}\}^T \quad (16)$$

$$X_{(b)} \equiv \{x_b, y_b, l_{ab}, l_{bg}, l_{gi}, a_{ba}, a_{bg}, a_{gi}, a_{gk}\}^T \quad (17)$$

$$X_{(c)} \equiv \{x_b, y_b, l_{ab}, l_{cd}, l_{hi}, l_{hj}, l_{bg}, l_{ce}, a_{ba}, a_{cd}, a_{ef}, a_{bg}, a_{hi}, a_{jk}\}^T \quad (18)$$

$$X_{(d)} \equiv \{x_b, y_b, l_{ab}, l_{hi}, l_{bg}, l_{hj}, a_{ba}, a_{bg}, a_{hi}, a_{jk}\}^T \quad (19)$$

Such state space $X_{(i)}$, is required to be uniquely transformable to the absolute coordinate space $X_{abs}$ for likelihood calculation described later. It is seen that in the case of the skeleton model (a), this can be achieved by the following equation (20). The coordinate transformation can be similarly performed for the other skeleton models (b), (c) and (d).

$$X_{abs} = \begin{bmatrix} x_a \\ y_a \\ x_b \\ y_b \\ x_d \\ y_d \\ x_f \\ y_f \\ x_g \\ y_g \\ x_i \\ y_i \\ x_k \\ y_k \end{bmatrix} = \begin{bmatrix} x_b + l_{ab} * \cos(a_{ba}) \\ y_b + l_{ab} * \sin(a_{ba}) \\ x_b \\ y_b \\ x_b + l_{bd} * \cos(a_{bd}) \\ y_b + l_{bd} * \sin(a_{bd}) \\ x_b + l_{bd} \cos(a_{bf}) \\ y_b + l_{bd} * \sin(a_{bf}) \\ x_b + l_{bf} * \cos(a_{bg}) \\ y_b + l_{bg} * \sin(a_{bg}) \\ x_b + l_{bg} * \cos(a_{bg}) + l_{gi} * \cos(a_{gi}) \\ x_b + l_{bg} * \sin(a_{bg}) + l_{gi} * \sin(a_{gi}) \\ x_b + l_{bg} * \cos(a_{bg}) + l_{gi} * \cos(a_{gk}) \\ x_b + l_{bg} * \sin(a_{bg}) + l_{gi} * \sin(a_{gk}) \end{bmatrix} = U(X_{(a)}) \quad (20)$$

(State Transition)

Next, state transition models of the skeleton models (a) to (d) in the state space X defined above will be described. A state transition model is desired to be a model with proper constraints imposed thereon so as to prevent transition to a normally impossible state for the motion of the body of a pedestrian, namely a human body. This is achieved by using the above-described coordinate system and state space, and by adjusting the Gaussian noise variance in the autoregressive model.

Further, the state of each skeleton model determined by the positions and angles of the respective sticks, which build the skeleton model, is constrained so that the mutual spatial arrangement of the sticks is a spatial arrangement which is possible in human body structure. More specifically, the movable range of the stick is restricted for the angle of each stick. In addition, a restriction is imposed that the length ratio among multiple sticks is kept constant during both the previous time and the current time. The imposition of restrictions (constraints) on the possible states means that points representing a skeleton model are localized in an area in the state space X. Further, the imposition of constraints on the state transition means that the state does not transition between mutually remote points in the state space X.

The state transition model with variance adjustment and constraints imposed on the state transition as described above makes it possible to constrain the state transition of the skeleton model by reflecting changes in the appearance of a pedestrian which are prevented from being unnatural. It also makes it possible to eliminate the possibility of transition to a skeleton in a state which cannot normally be considered as a pedestrian, allowing the particles to scatter toward a higher likelihood of presence of the state of the skeleton in the state space X.

(State Transition of Absolute Coordinates of Base Point)

An equation of a state transition model reflecting the above will be described for each variable. First, for the state transition of the absolute coordinates $x_b$, $y_b$ of the base point, a second-order autoregressive model (AR model: refer to the above-described "Introduction to Time Series Analysis" by Genshiro Kitagawa) which can consider velocity is applied. Here, assuming that $u_t$ is a predicted value of the state of each variable after the state transition, that $u_{t-1}$ and $u_{t-2}$ are respectively states one period and two periods before (in which "one period before" means "one step before", which also applies below), and that $w_c$ is a Gaussian noise with zero average, the state transition model can be expressed by the following equation (21):

$$u_t = 2u_{t-1} - u_{t-2} + w_c \quad (21)$$

(State Transition of Stick Length)

The state transition of the stick length $l_{pq}$ is performed by a two-step process. First, a zoom parameter z is probabilistically determined by the following equation (22). Thereafter, the state $u_{t-1}$ one period before is multiplied by z, and then the state is transitioned by a first-order autoregressive model as shown in equation (23).

$$z = \gamma^{w_z} \quad (22)$$

$$u_t = zu_{t-1} + w_l \quad (23)$$

Here, $w_z$ is a Gaussian noise with zero average, γ is a positive constant, and $w_l$ is a Gaussian noise with zero average. This can be appropriately adapted to enlargement and reduction of the skeleton model corresponding to the approach and departure of the pedestrian, with the length ratio among the sticks at previous time being kept, by making the contribution of the first-order autoregressive model smaller than the contribution of the zoom parameter z in determining the length. Such adjustment is achieved by controlling the variances of $w_z$ and $w_l$.

(State Transition of Stick Angle)

Figure 10:
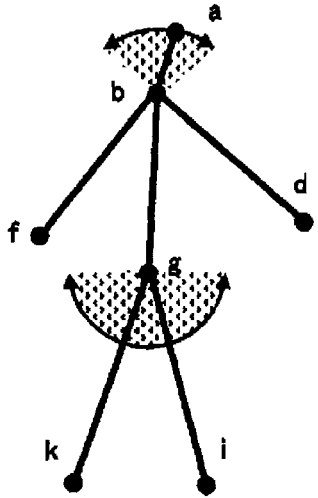
FIG. 10 is an explanatory view of constraints on the shape of a skeleton model used in the pedestrian tracking method.

FIG. 10 shows a specific example of constraints on the shape of a skeleton model used in the pedestrian tracking method. More specifically, the movable range of the neck stick is set within an upper 90 degrees, while setting the movable ranges of the left and right legs to be up to the horizontal position. Considering these movable ranges, the following restrictions are imposed on the respective skeleton models for the state transition of the stick angle $a_{pq}$:

- $-3\pi/4 < a_{ba} < -\pi/4$ [Skeleton model (a),(b),(c),(d)]
- $\pi/4 < a_{bg} < 3\pi/4$ [Skeleton model (a),(b),(c),(d)]
- $0 < a_{bd}, a_{bf} < \pi$ [Skeleton model (a)]
- $0 < a_{gi}, a_{gk} < \pi$ [Skeleton model (a),(b)]
- $0 < a_{cd}, a_{ef} < \pi$ [Skeleton model (c)]
- $0 < a_{hi}, a_{jk} < \pi$ [Skeleton model (c),(d)]
- $(a_{bd} - a_{bg})(a_{bf} - a_{bg}) < 0$ [Skeleton model (a)]
- $(a_{gi} - a_{bg})(a_{gk} - a_{bg}) < 0$ [Skeleton model (a),(b)]
- $(a_{cd} - a_{bg})(a_{ef} - a_{bg}) < 0$ [Skeleton model (c)]
- $(a_{hi} - a_{bg})(a_{jk} - a_{bg}) < 0$ [Skeleton model (c),(d)]

A second-order autoregressive model considering average is applied under these restrictions. This can be expressed by the following equation (24):

$$u_t = \alpha \times (2u_{t-1} - u_{t-2}) + (1 - \alpha) \times \sigma + w_d \quad (24)$$

Here, σ represents an average which is $-\pi/2$ for the transition of angle $a_{ba}$ and $\pi/2$ for the transition of the other angles $a_{pq}$, while α is a constant satisfying $0 \leq \alpha \leq 1$, controlling the influence exerted by the average σ. In particular, if α=1, the average is not considered. Further, $w_a$ is a Gaussian noise with zero average, and is determined not to exceed the restrictions described above.

According to the state transition model described above, the state transition in the case of e.g. the skeleton mode (a) can be expressed by the following equation (25), where $F_1$, $F_2$, C, σ and W are given by equations (26) to (30), respectively:

$$x_t = F_1 \cdot x_{t-1} + F_2 \cdot x_{t-2} + C\sigma + W \quad (25)$$

$$F_1 = \begin{bmatrix} 2I_2 & O_{2\times 4} & O_{2\times 6} \\ O_{4\times 2} & \gamma^{w_z} I_4 & O_{4\times 6} \\ O_{6\times 2} & O_{6\times 4} & 2\alpha I_6 \end{bmatrix} \quad (26)$$

$$F_2 = \begin{bmatrix} -I_2 & O_{2\times 4} & O_{2\times 6} \\ O_{4\times 2} & O_{4\times 4} & O_{4\times 6} \\ O_{6\times 2} & O_{6\times 4} & -\alpha I_6 \end{bmatrix} \quad (27)$$

$$C = \begin{bmatrix} O_{6\times 6} & O_{6\times 6} \\ O_{6\times 6} & (1-\alpha)I_6 \end{bmatrix} \quad (28)$$

$$\sigma = [O_{1\times 6} \ -\pi/2 \ \pi/2 \ \pi/2 \ \pi/2 \ \pi/2 \ \pi/2]^T \quad (29)$$

$$W = [w_c \ w_c \ w_l \ w_l \ w_l \ w_l \ w_a \ w_a \ w_a \ w_a \ w_a \ w_a]^T \quad (30)$$

Here, $I_N$ is a unit matrix of N×N, and $O_{N\times M}$ is a zero matrix of N×M. Important parameters to determine the performance of the state transition model are variances of the added Gaussian noises $w_c$, $w_z$, $w_l$ and $w_a$. These are required to be determined according to disorder and complexity of the target to be processed. Assume that the transition of the absolute coordinate $u_t$ of a node is given by the following equation (31) depending on the respective Gaussian noises, and consider respective influences ρ as in the following equation (32) which are exerted on $u_t$ by the respective noises:

$$u_t = f(u_{t-1}, w_c, w_z, w_l, w_a) \quad (31)$$

$$\rho_c = |f(u_{t-1}, w_c, w_z, w_l, w_a) - f(u_{t-1}, 0, w_z, w_l, w_a)|$$

$$\rho_z = |f(u_{t-1}, w_c, w_z, w_l, w_a) - f(u_{t-1}, w_c, 0, w_l, w_a)|$$

$$\rho_l = |f(u_{t-1}, w_c, w_z, w_l, w_a) - f(u_{t-1}, w_c, w_z, w_l, 0)|$$

$$\rho_a = |f(u_{t-1}, w_c, w_z, w_l, w_a) - f(u_{t-1}, w_c, w_z, w_l, 0)| \quad (32)$$

In the following, the determination of the relationship in magnitude among the above-described influences ρ will be described. First, the relative positional relationship of the respective nodes is determined by $\rho_z$, $\rho_l$ and $\rho_a$, so that the positional relationship of the nodes at previous time (t−1) can be maintained by setting $\rho_c > \rho_z, \rho_l, \rho_a$. Further, $\rho_a > \rho_z, \rho_l$ is set since the probability for the stick length to suddenly change is considered to be low. However, note that for $w_a$, it is not necessary to use the same variance for all stick angles $a_{pq}$. For example, the waist angle $a_{bg}$ is less likely to much transition than the hand angle $a_{bd}$. Thus, the variance of the Gaussian noise used for the transition of $a_{bg}$ is set to be smaller than the variance of the Gaussian noise used for the transition of $a_{bd}$. For $\rho_z, \rho_l$, $\rho_z > \rho_l$ is set to maintain the length ratio among the sticks at the previous time as described above.

In summary, the above leads to $\rho_c > \rho_a > \rho_z > \rho_l$. By controlling the variances of $w_c$, $w_z$, $w_l$ and $w_a$ to satisfy this inequality, it is possible to constrain the state transition so that the respective particles transitioned in state are more likely to scatter toward a higher possibility of a skeleton model of a pedestrian while, in contrast, less likely to scatter toward its lower possibility.

(Likelihood Calculation of Particles)

As a method of calculating likelihood $\pi_t^{(n)}$, a method based on the maximum value search in a distance-transformed image is used, which is obtained by extending a method used in the contour tracking using CONDENSATION. These will be described in detail below. More specifically, the distance-transformed image to be used in the likelihood calculation step is an image represented by a black and white density such that its intensity increases as its position shifts from a black contour part representing a pedestrian region to the inside of the contour. The likelihood of each predicted skeleton model is calculated, with the distance-transformed image being superimposed on the skeleton model, by using a distance from each of the multiple points on the sticks building the skeleton model to an extreme intensity point, e.g. maximum intensity point, of the distance-transformed image present on a normal of each stick at the each point.

The likelihood calculation method as described above can calculate the likelihood of each estimated skeleton model with high accuracy, because both the sticks of the skeleton model and the high intensity portions of the distance-transformed image reflect the bone structure of a human body, while the degree of their superimposition can be estimated by the distance to the maximum intensity point. For example, as the sum of the distances to the maximum intensity points decreases, the degree of superimposition increases, increasing the likelihood.

As described above, the concept of the likelihood calculation used in the contour tracking using CONDENSATION is applied to calculate the likelihood π of particles. In the contour tracking using CONDENSATION, edges in an input image are searched with respect to several points on the predicted B-spline curve to use the distances between the predicted contour and edges so as to evaluate the likelihood of the particles. Thus, in the pedestrian tracking method according to the present embodiment, the likelihood is calculated by comparing the predicted skeleton model with a morphological skeleton (skeleton model obtained from an image by image processing) of the observed data.

More specifically, points on the morphological skeleton which are on the normal of, and closest to, the sticks are searched with respect to several points on the sticks building the skeleton model, so as to use their distances to the predicted skeleton model to calculate the likelihood of the particles corresponding to the skeleton model. Note that points on the skeleton model used as starting points of the search are referred to as search base points.

(Distance-Transformed Image)

Figure 11A:
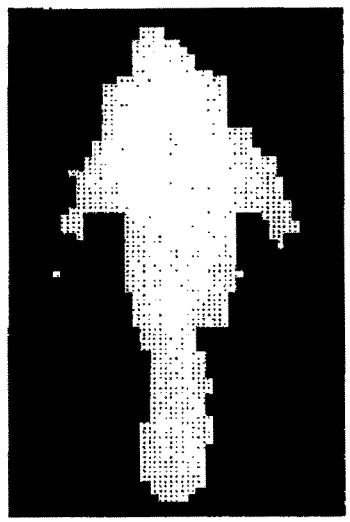
Figure 11B:
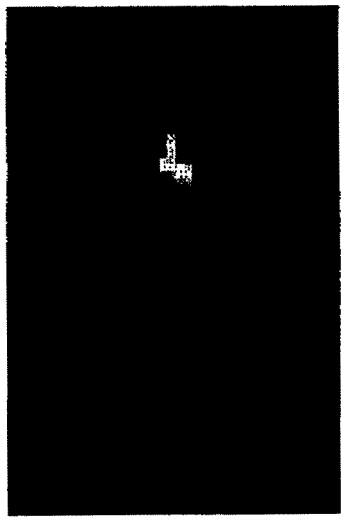
FIG. 11B is a view showing a distance-transformed image obtained by subjecting the pedestrian region to distance transform.

FIG. 11A shows a pedestrian region image as a target to be tracked, while FIG. 11B shows an example of a distance-transformed image obtained by subjecting the image to distance transform. A morphological skeleton is obtained as a distance-transformed image obtained by subjecting a binary image to distance transform. The distance-transformed image is generated such that the distance from a pixel of interest to a pixel having a pixel value of 0 (zero) in the binary image is transformed as a pixel value of the pixel of interest. If the pixel value of the pixel of interest is 0 (zero), the distance is 0 (zero). Here, assuming that the region of the pixel value of zero in a binary image is B, the pixel value D(x,y) of a pixel with coordinates (x,y) in a distance-transformed image can be expressed by the following equation (33):

$$D(x, y) = \begin{cases} 0 & (x, y) \in B \\ \min_{(x_i, y_i) \in B} \sqrt{(x-x_i)^2 + (y-y_i)^2} & (x, y) \notin B \end{cases} \quad (33)$$

(Simple Likelihood Calculation)

Figure 12A:
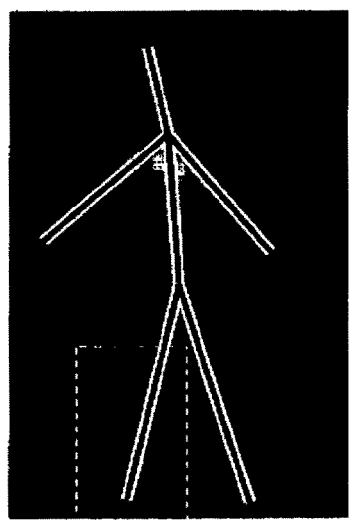
Figure 12B:
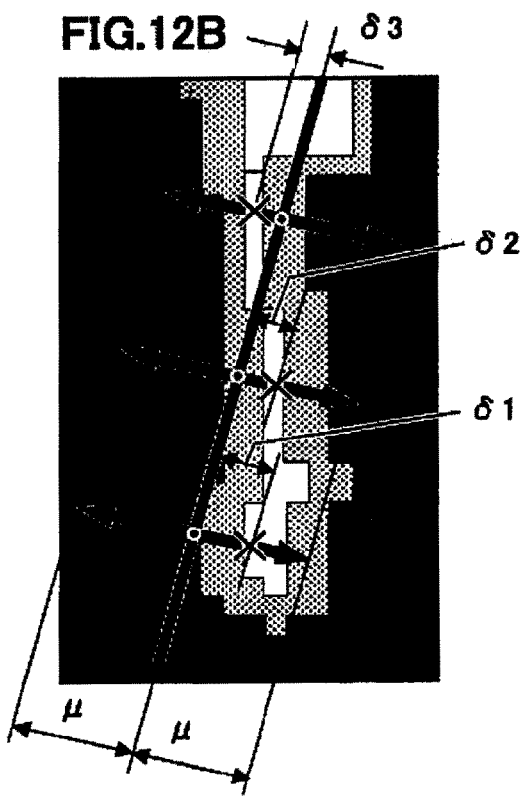
FIG. 12B is a view for explaining a method of obtaining a likelihood from the Figure with the superimposition.

FIG. 12A shows a state in which a predicted skeleton model is superimposed on a distance-transformed image, while FIG. 12B shows a method of obtaining a likelihood from the Figure with the superimposition. In the present embodiment, a binary image assuming the pixel value of the candidate pedestrian region to be 1 (one) is used as an image before the distance transform, where 1 (one) represents white and 0 (zero) represents black. This binary image is obtained at a preliminary stage of tracking.

Assume that a skeleton as shown in FIG. 12A is predicted in the prediction step. The search of the morphological skeleton in the distance-transformed image is achieved by obtaining extreme intensity points, e.g. maximum points, in the distance-transformed image which are each on the normal of, and closest to, each search base point on the predicted skeleton model.

Assume that $\delta_i^{(n)}$ is a distance from an i-th search base point to the searched maximum point on the skeleton model. An extremely simple method of calculating the likelihood of a particle n calculates $e^{(n)}$ given by the following equation (34). Here, r is a constant for scaling, and μ is a constant representing a search range. Equation (34) follows formula (7) for calculating the likelihood in the contour tracking using CONDENSATION. The likelihood $\pi^{(n)}$ of the particle n is calculated by normalizing the thus calculated $e^{(n)}$ as in equation (35):

$$e^{(n)} = \exp\left\{-\frac{1}{r}\sum_i (\min(\delta_i^{(n)}, \mu))^2\right\} \quad (34)$$

$$\pi^{(n)} = \frac{e^{(n)}}{\sum_{k=1}^{N} e^{(k)}} \quad (35)$$

(Higher Accuracy Likelihood Calculation)

Figure 13A:
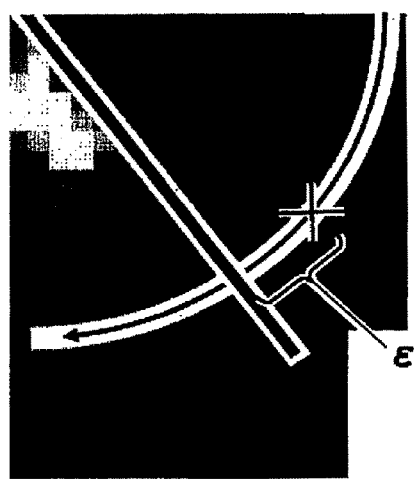
FIGS. 13A and 13B are views for explaining other methods of obtaining the likelihood in the pedestrian tracking method.
Figure 13B:
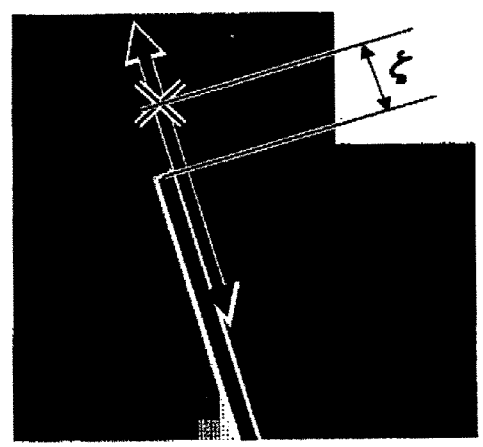

FIGS. 13A and 13B show other methods of obtaining the likelihood in the pedestrian tracking method. It can be mentioned that the above-described simple likelihood calculation method has the following two problems: (1) the likelihood increases when the hand stick overlaps the waist stick; and (2) the likelihood increases as the length of the stick decreases. Improvements on the two points will be described below.

(1. Countermeasure to the Overlap between Hand and Waist Sticks)

When a maximum point of a distance-transformed image is searched using a point on e.g. hand stick $ST_{bd}$ as a search base point, a maximum point originating from the waist cannot be distinguished from a maximum point originating from the hand. Thus, when a skeleton model causing predicted hand stick to overlap waist stick $ST_{bg}$, there is a problem that from the search using points on both sticks as search base points, maximum points both originating from the trunk are detected, resulting in the obtainment of high likelihood.

Thus, when using a search base point on the hand stick, a maximum point is searched from an upper portion to a lower portion of a circumference having a center angle of π/2 as shown in FIG. 13A. The likelihood is calculated based on length ε to a search base point which is on a search line and obtained from the angle at a first detected maximum point. In other words, a maximum point closer to the horizontal direction is prioritized to solve the above-described problem. This is based on the fact that maximum points detected at angles closer to the vertical direction are likely to originate from the trunk. A value obtained based on such search from a j-th search base point is assumed to be $\epsilon_j^{(n)}$.

(2. Countermeasure to the Higher Likelihood of Shorter Sticks)

With a decrease in the stick length, the search base points aggregate more. This means that a higher likelihood is calculated if a maximum point in the distance-transformed image is present near the aggregated points. This may cause the problem that each stick length becomes shorter each time the state transition is repeated. Thus, as shown in FIG. 13B, an end point (distance ζ) of the morphological skeleton is to be searched in the direction of the stick. A value obtained based on such search from a k-th search base point is assumed to be $\zeta_k^{(n)}$. In order to solve the above-described problem, the distance to the end point is additionally considered in the likelihood so as to allow ζ to be larger when the stick length is shorter.

(Improved Likelihood)

Using the thus obtained $\delta_i^{(n)}$, $\epsilon_j^{(n)}$ and $\zeta_k^{(n)}$, $e^{(n)}$ is calculated by the following equation (36). Here, $\xi_i$, $\xi_j$ and $\xi_k$ are weighting factors. The likelihood $\pi^{(n)}$ is calculated by normalizing the thus calculated $e^{(n)}$ of the following equation (36) using the above equation (35):

$$e^{(n)} = \exp\left[-\frac{1}{r}\left\{\sum_i \xi_i(\min(\delta_i^{(n)}, \mu))^2 + \sum_j \xi_j(\min(\epsilon_j^{(n)}, \mu))^2 + \sum_k \xi_k(\min(\zeta_k^{(n)}, \mu))^2\right\}\right] \quad (36)$$

EXAMPLES

Hereinafter, the above-described pedestrian tracking method is applied to various image sequences (time-series images) for evaluation. First, an implementation method will be shown. Next, the pedestrian tracking method according to the embodiment of the present invention (hereafter referred to as proposed method) and tracking methods to be compared will be applied to artificially generated sequences and actual sequences, respectively, so as to show the validity of the present invention based on the results.

(Implementation Method)

Generally, causes of failure in pedestrian tracking are, for example, occlusion, sudden change in the velocity of a pedestrian, presence of an object similar to the pedestrian as a tracking target, and so on. In order to evaluate the performance of the pedestrian tracking method of the present invention, it is desirable to evaluate using various actual sequences including these causes. However, it is difficult to obtain e.g. an actual sequence in which parameters such as velocity of a tracking target are finely controlled. Further, for the evaluation, true values are needed, but its manual input is inefficient.

Thus, first, the characteristics of the proposed method will be examined by use of sequences artificially generated using a software. Next, the proposed method will be applied to several kinds of actual sequences to evaluate the tracking accuracy. Further, the number of particles and the four patterns of skeleton models (a), (b), (c) and (d) will be compared for comparison with the existing methods and examination.

In the following, the tracking methods to be compared will be described, and then evaluation criteria will be described. Finally, the artificial sequences and the actual sequences used for evaluation will be described respectively. Further, misdetections of a pedestrian region are classified into the following two kinds. One is a misdetection e.g. due to a stationary object in the foreground to cause a part or whole of the pedestrian region to be lost, which is referred to as static misdetection. The other is a misdetection e.g. due to a moving object other than the tracking target to cause a region different from a true pedestrian region to be detected as a pedestrian region, which is referred to as dynamic misdetection. The causative objects of these misdetections are referred to as static misdetection and dynamic misdetection, respectively.

(Tracking Methods to be Compared)

Tracking methods to be compared with the proposed method, to be mentioned here, are a center-of-gravity tracking method using a Kalman filter, and a contour tracking method using CONDENSATION. Their implementations will be briefly described. The center-of-gravity tracking using a Kalman filter searches pixels in a candidate pedestrian region closest from a center-of-gravity position predicted by a Kalman filter so as to obtain, in a contiguous region with the pixels, center-of-gravity coordinates to be corrected by a Kalman filter for tracking.

The contour tracking using CONDENSATION performs learning based on principal component analysis, using true values of 15 (fifteen) frames preceding the starting frame of the tracking. The number of nodes of B-spline curve to approximate the contour is set 32 (thirty-two). The 3×3 Sobel operator is used to detect edges to be used for the likelihood calculation (measurement).

The contour tracking using CONDENSATION can generally track an object with any shape by pre-learning using principal component analysis. Thus, a method obtained by exclusively ex$_t$ending the contour tracking using CONDENSATION to the pedestrian tracking, and by increasing its accuracy, is implemented and added as a method to be compared. This method is hereafter referred to as pedestrian contour tracking.

As above, the following four methods are to be evaluated: (1) proposed method; (2) center-of-gravity tracking using a Kalman filter; (3) contour tracking using CONDENSATION; and (4) pedestrian contour tracking using CONDENSATION.

(Pedestrian Contour Tracking)

Figure 14:
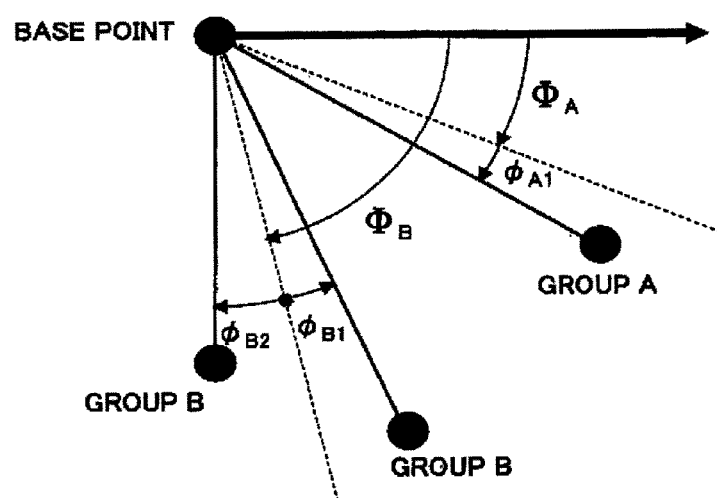
FIG. 14 is an explanatory view of a coordinate system used in a pedestrian contour tracking method using CONDENSATION to be compared.

In the following, the pedestrian contour tracking using CONDENSATION, which is one of the tracking methods to be compared, will be described. The pedestrian contour tracking using CONDENSATION constrains a state transition by restricting the tracking target to pedestrians instead of constraining the state transition by using principal component analysis. First, the 32 control points on the B-spline curve to approximate the contour of a pedestrian are classified into six groups that are the head, trunk and four limbs. Similarly as in the proposed method, a base point is set, and respective nodes are expressed by their distances from the base point and angles to the x-axis in the coordinate system representing the control points of the B-spline curve. Assume that $\theta_{Ij}$ is an angle of a node belonging to Group I and having a node index j in Group I. Then, as shown in FIG. 14, the angle $\theta_{Ij}$ is expressed as a sum of a common angle $\Phi_I$ in the group and a relative angle $\phi_{Ij}$ therefrom, that is $\theta_{Ij}=\Phi_I+\phi_{Ij}$.

The state transition of the angle $\theta_{Ij}$ is performed in two separate stages. First, the common angle $\Phi_I$ in the group is transitioned by a second-order autoregressive model, and then the relative angle $\theta_{Ij}$ is transitioned by a first-order autoregressive model. More specifically, the state transition model of the following equation (37) is used:

$$\theta_{Ij,t} = \Phi_{I,t} + \phi_{Ij,t} \qquad (37)$$
$$= 2\Phi_{I,t-1} - \Phi_{I,t-2} + w_g + \Phi_{Ij,t-1} + w_l$$

By making the variance of the Gaussian noise $w_l$ smaller than the Gaussian noise $w_g$ here, the relationship of relative angles among nodes in the group is maintained, so that an efficient pedestrian tracking is expected to be achievable. Further, the state transition models of the absolute coordinates of the base point and the distances between the base point and the respective nodes use a second-order autoregressive model and a first-order autoregressive model, respectively.

(Evaluation Criteria)

Figure 15:
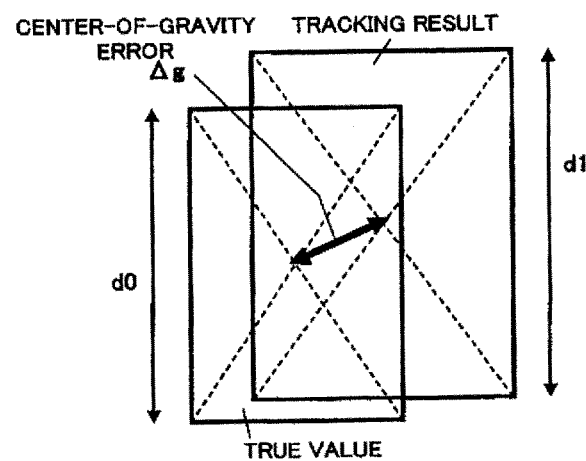
FIG. 15 is an explanatory view of evaluation criteria for evaluating tracking accuracy.
Figure 16A:
FIGS. 16A to 16I are views showing a part of image sequences used for evaluation of the pedestrian tracking method.
Figure 16B:
Figure 16C:
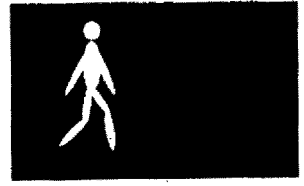
Figure 16D:
Figure 16E:
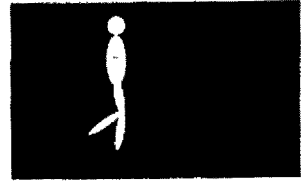
Figure 16F:
Figure 16G:
Figure 16H:
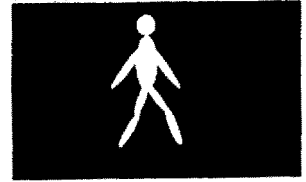
Figure 16I:
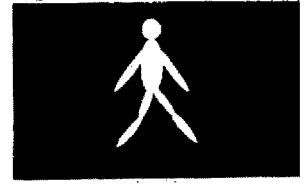

FIG. 15 shows evaluation criteria for evaluating the tracking accuracy in the pedestrian tracking method. A tracking result according to the proposed method is shown by a skeleton of the pedestrian, and a result of the center-of-gravity tracking using a Kalman filter to be compared is shown by center-of-gravity coordinates, while results of the contour tracking using CONDENSATION and the pedestrian contour tracking using CONDENSATION to be further compared are each shown by a contour of the pedestrian.

In order to compare and examine these results in a unified manner, a rectangle as shown in FIG. 15 to contain an object estimated by the tracking is used to obtain (1) a center-of-gravity error $\Delta g$ that is a Euclid distance between the center-of-gravity position of the estimated rectangle and the true value, and (2) a scale error that is a ratio between height d1 of the estimated rectangle and height d0 of the true value so as to use these values as evaluation criteria.

The unit of the center-of-gravity error $\Delta g$ is pixel. A smaller center-of-gravity error indicates a higher tracking accuracy, while a scale error closer to 1 (one) indicates predictability of the shape of the pedestrian with higher accuracy. Now, the state estimate using a Monte Carlo filter is a probabilistic method which obtains a different tracking result each time. Thus, the pedestrian tracking is performed 100 (hundred times) for each sequence so as to calculate an average of these as the above-described values for evaluation.

(Artificial Sequence)

A software to artificially generate sequences was implemented using C language. Each generated sequence is a binary image having a candidate pedestrian region having a pixel value of 1 (one), in which this image is distance-transformed and input to the proposed method. The size of the image is set as 720×480, and the number of frames as 200. This software can output not only the sequences for input, but also true values used for evaluation, initial value setting and pre-learning. This software will be described below.

FIGS. 16A to 16I show a part of image sequences used for the evaluation of the pedestrian tracking method. These images are images obtained by enlarging each pedestrian region in a part of the sequences in the simplest case without the static misdetection or dynamic misdetection. As shown in these Figures, 8 (eight) ellipses were used to form a human-shaped object. Each human-shaped object image was generated by respectively calculating, in each frame, the coordinates of the center of each ellipse as well as the lengths of the major and minor axes and the inclination of the major axis of each ellipse, and by setting the pixel value of the region in each ellipse as 1 (one).

The above-described software for generating the artificial sequences can be controlled in the initial position, velocity, acceleration and the like of the human-shaped object. Further, both the static detection and the dynamic detection can be added, and can be controlled in shape, position and the like. Thus, the sequences shown below were generated for evaluation.

(Normal Sequence)

A sequence without added static misdetection and dynamic misdetection is used for evaluation. This sequence is referred to below as sequence N.

(Reverse Reproduction Sequence)

In the middle of sequence N, the sequence is reversely reproduced to change the velocity of the pedestrian to the opposite direction so as to generate a sequence to be used for evaluation. This sequence is referred to below as sequence R. In sequence R, the sequence was reversely reproduced at the 59th frame and 107th frame.

(Sequence with Added Guardrail Type Static Misdetection)

Figure 17A:
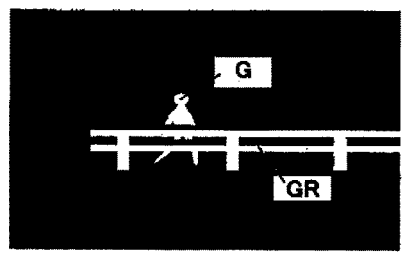
FIGS. 17A and 17B are views showing a part of image sequences to evaluate guardrail type static misdetection used for the evaluation of the pedestrian tracking method.
Figure 17B:
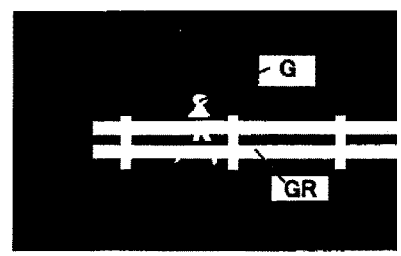

FIGS. 17A and 17B show a part of image sequences to evaluate guardrail type static misdetection used for the evaluation of the pedestrian tracking method. As shown in these Figures, sequences with static misdetections GR likened to two patterns of guardrails and added to the sequence N were prepared. These sequences are referred to below as sequences G1 and G2, respectively. In these sequences, a part of pedestrian region G is lost from the 18th frame and onward due to the static misdetection.

(Sequence with Added Pole Type Static Misdetection)

Figure 18A:
FIGS. 18A, 18B and 18C are views showing a part of image sequences to evaluate pole type static misdetection used for the evaluation of the pedestrian tracking method.
Figure 18B:
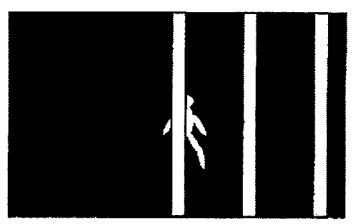
Figure 18C:

FIGS. 18A, 18B and 18C show a part of image sequences to evaluate pole type static misdetection used for the evaluation of the pedestrian tracking method. As shown in these Figures, sequences with static misdetections P likened to three patterns of poles and added to the sequence N were prepared. These sequences are referred to as sequences P1, P2 and P3, respectively. In sequence P1, a part of the pedestrian region is lost due to the static misdetection in the 9th to 40th, 72nd to 92nd, and 124th to 144th frames. In sequence P2, a part of the pedestrian region is lost due to the static misdetection in the 9th to 42nd, 72nd to 95th, and 124th to 152nd frames. In sequence P3, a part of the pedestrian region is lost due to the static misdetection in the 9th to 42nd, 48th to 70th, 77th to 96th, and 101st to 160th frames.

(Sequence with Added Car Type Dynamic Misdetection)

Figure 19A:
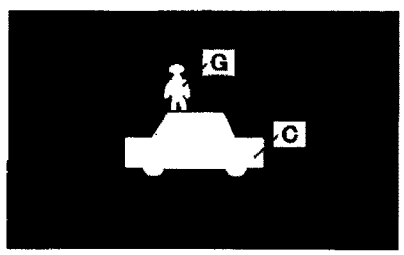
FIGS. 19A and 19B are views showing a part of image sequences to evaluate dynamic misdetection used for the evaluation of the pedestrian tracking method.
Figure 19B:
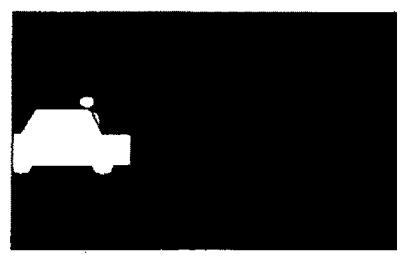

FIGS. 19A and 19B show a part of image sequences to evaluate dynamic misdetection used for the evaluation of the pedestrian tracking method. As shown in these Figures, there were prepared sequences with four patterns of dynamic misdetections added to the sequence N, which are composed of dynamic misdetections C likened to two patterns of cars with a moving direction of the car the same as that of the pedestrian and to those with the opposite direction. These sequences are referred to as sequences C1, C2, C3 and C4. In sequences C1 and C3, the moving direction of the car is opposite to that of the pedestrian, while in sequences C2 and C4, the moving direction of the car is the same direction as the pedestrian. In sequence C1, the pedestrian region G overlaps the dynamic misdetection region in the 18th to 37th, 96th to 109th, and 169th to 180th frames. In sequence C2, the pedestrian region G overlaps the dynamic misdetection region in the 9th to 34th, and 141st to 158th frames. In sequence C3, the pedestrian region G overlaps the dynamic misdetection region in the 18th to 41st, 91st to 113th, and 163rd to 185th frames. In sequence C4, the pedestrian region G overlaps the dynamic misdetection region in the 2nd to 40th, and 128th to 165th frames.

(Actual Sequences)

Figure 20A:
Figure 20D:
FIG. 20D is a view showing a binary image obtained from FIG. 20A.
Figure 20B:
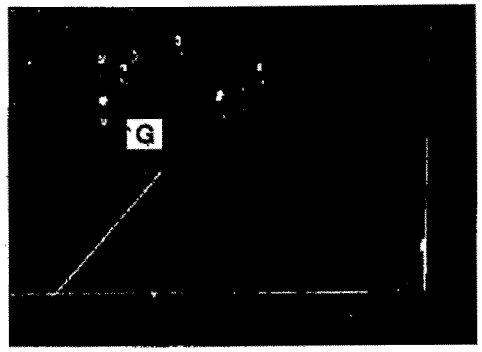
Figure 20C:
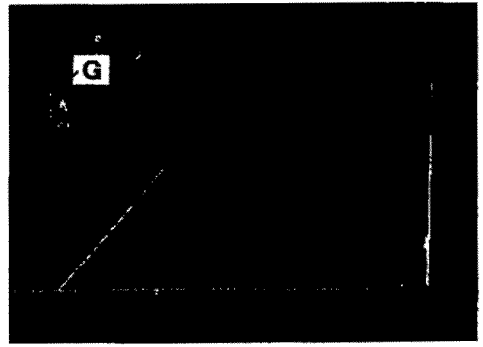

FIGS. 20A, 20B and 20C show a part of actual image sequences used for the evaluation of the pedestrian tracking method, while FIG. 20D shows a binary image obtained from FIG. 20A. A data set provided by PETS (IEEE International Workshop on Performance Evaluation of Tracking and Surveillance:http://www.cvg.cs.rdg.ac.uk/slides/pets.html) was used as true values of the actual sequences and tracking target coordinates used for the evaluation. FIGS. 20A, 20B and 20C show a part of three sequences used for the evaluation. The rectangle G in each Figure indicates a pedestrian as a tracking target. Hereafter, the sequence shown in FIG. 20A is referred to as sequence U, the sequence shown in FIG. 20B as sequence S1, and the sequence shown in FIG. 20C as sequence S2. These sequences were captured by a fixed camera. The image size of sequence U is 768×576, and the image size of sequences S1 and S2 is 720×576. The number of frames for tracking is set 200.

In sequence U, the motion of the tracking target is simple, but an occlusion occurs in the 135th to 140th frames due to an electric pole in the foreground. In sequences S1 and S2, the motion of the tracking target is complex, and many other objects similar to the tracking target are present in the image. Further, in sequence S2, the tracking target almost completely overlaps another object in the 12th to 23rd, 112th to 121st, and 154th to 166th frames, causing it to be a sequence which is extremely difficult to track.

(Initial State Vector and Distance-Transformed Image)

The proposed method requires input of an initial state vector $x_0$ and a distance-transformed image. The initial state vector $x_0$ is to be provided manually. The distance-transformed image is generated based on a difference image obtained using background subtraction. Assuming that $I_{orig}(x,y)$ is a pixel value of an original image at coordinates (x, y), and $I_{bg}(x,y)$ is a pixel value of the background image, the pixel value $I_{sub}(x,y)$ of the difference image can be obtained as an absolute difference value between the original image and the background image as in the following equation (38):

$$I_{sub}(x,y) = |I_{orig}(x,y) - I_{bg}(x,y)| \qquad (38)$$

A pixel value of a binary image, $I_{bin}(x,y)$, is calculated from the difference image by a thresholding shown in the following equation (39). This allows to obtain a binary image having a pixel value of 1 (one) in a region thereof in which a moving object is present in the original image, where $\tau$ is a threshold value:

$$I_{bin}(x, y) = \begin{cases} 1 & (I_{sub}(x, y) \geq \tau) \\ 0 & (I_{sub}(x, y) < \tau) \end{cases} \qquad (39)$$

FIG. 20D shows an image obtained by background subtraction from sequence U shown in FIG. 20A. A distance-transformed image was generated by subjecting the thus obtained binary image to distance transform shown in equation (33).

(Evaluation Results)

The following shows evaluation results using the above-described evaluation methods for respective sequences, and describes the validity of the proposed method. In FIG. 21 to FIG. 35 showing the evaluation results, curves a, b, c and d correspond to the results of the following methods, respectively:

Proposed method (curve a);
Center-of-gravity tracking using Kalman filter (curve b);
Contour tracking using CONDENSATION (curve c); and
Pedestrian contour tracking using CONDENSATION (curve d).

(Sequence N)

First, in the case where the proposed method was applied to sequence N, and the number of particles for each of the above-described skeleton models was varied, the tracking accuracy is evaluated based on a center-of-gravity error calculated as an average of all the frames. The evaluation results are shown in Table 1.

TABLE 1

Evaluations Results in Sequence N (Center-of-Gravity)

| Number of Particles | 100 | 1,000 | 10,000 |
|---|---|---|---|
| Skeleton model (a) | 7.192 | 3.365 | 2.248 |
| Skeleton model (b) | 9.004 | 7.425 | 6.416 |
| Skeleton model (c) | 10.129 | 7.469 | 5.935 |
| Skeleton model (d) | 8.986 | 7.421 | 6.411 |

It could be found from this result that an increase in the number of particles causes an increase in tracking accuracy. It is expected that the skeleton model (a) is most suitable for sequence N because of hand detection and no shoulder width. It could be found from the result that the expected result is obtained. In the evaluation of the artificial sequences below, the number of particles is set 1,000, and the skeleton model (a) is used.

Figure 21A:
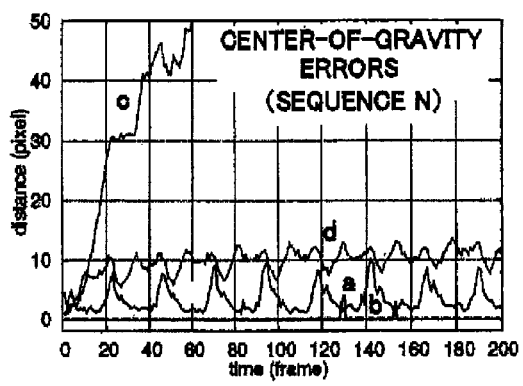
Figure 21B:
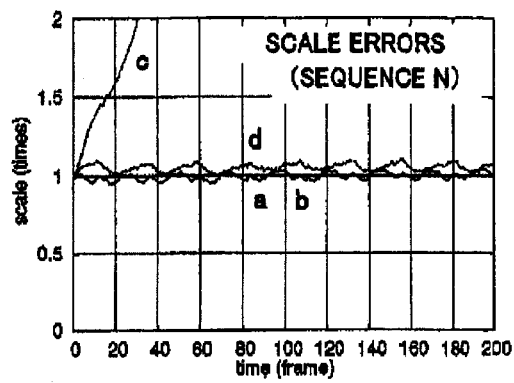
FIG. 21B is a graph showing evaluation results of scale errors therefor.

FIG. 21A shows evaluation results of the center-of-gravity errors for sequence N, while FIG. 21B shows evaluation results of the scale errors. The horizontal axis represents time, and its unit is frame.

The results indicate that the center-of-gravity tracking using a Kalman filter (curve b) showed a performance with substantially no error. This is because the center of gravity of the tracking target can be accurately extracted in sequence N in which there is no noise at all. The proposed method (curve a) shows a better performance than the contour tracking using CONDENSATION (curve c) and the pedestrian contour tracking using CONDENSATION (curve d), but shows periodic variations in the center-of-gravity errors. This period is the same as the period of walking, causing larger errors in frames as in FIGS. 15E and 15F (sic, correctly 16E and 16F). It is considered that this is because the knee joints are not modeled in the proposed method so that the accuracy of the likelihood calculation of particles decreases. It can be found in the contour tracking using CONDENSATION (curve c) that scale errors increase. This indicates that the constraint(s) on the state transition using principal component analysis is not proper. An increase in the scale errors causes the likelihood of the particles to decrease, thereby causing the tracking target to be lost as in FIG. 21A. Further, in a general-purpose tracking method such as the contour tracking using CONDENSATION (curve c), once the error becomes large, it is unlikely that it becomes small again. On the other hand, in the proposed method (curve a), it could be found that even when the error becomes temporarily large, the error can be made small again.

(Sequence R)

Figure 22A:
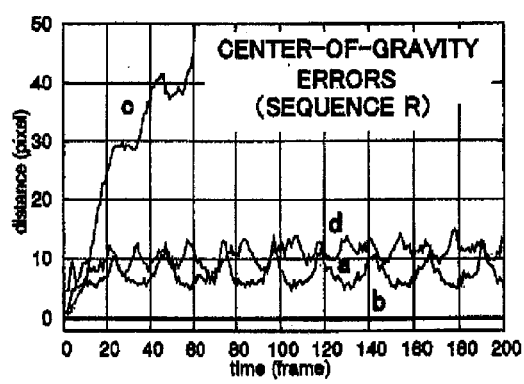
Figure 22B:
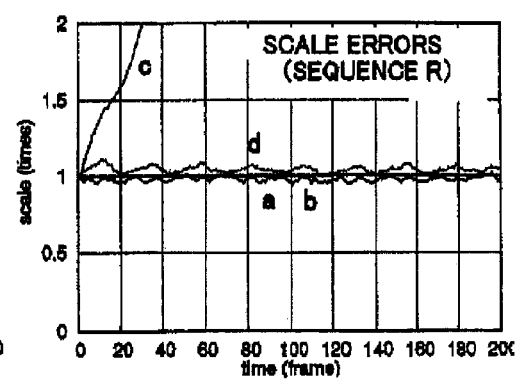
FIG. 22B is a graph showing evaluation results of the scale errors therefor.

FIG. 22A shows evaluation results of the center-of-gravity errors for sequence R, while FIG. 22B shows evaluation results of the scale errors. In sequence R, substantially similar results to those for sequence N were obtained. It is considered that this is because the moving distance of the tracking target between frames is small so that even a sudden reverse reproduction exerts substantially no influence.

(Sequences G1 and G2)

Figure 23A:
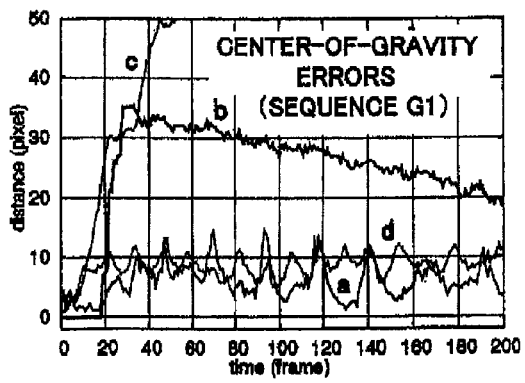
Figure 23B:
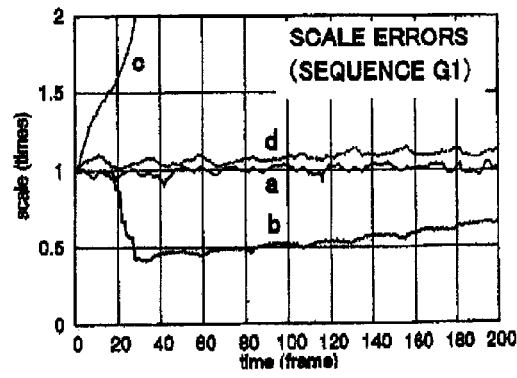
FIG. 23B is a graph showing evaluation results of the scale errors therefor.
Figure 24A:
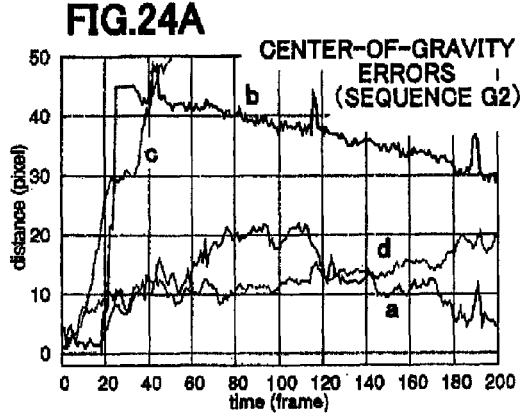
Figure 24B:
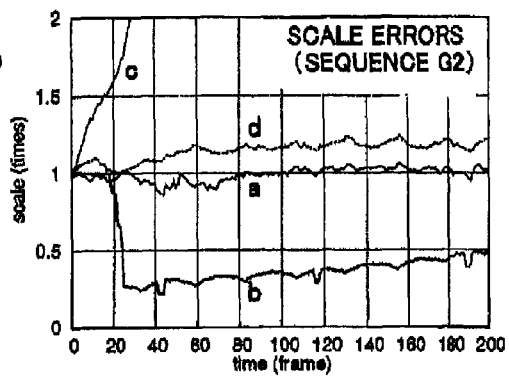
FIG. 24B is a graph showing evaluation results of the scale errors therefor.

FIGS. 23A and 23B show evaluation results for sequence G1, while FIGS. 24A and 24B show evaluation results for sequence G2. Sequences G1 and G2 show a more noticeable reduction than sequence N in accuracy of the center-of-gravity tracking using a Kalman filter (curve b) because the pedestrian region is divided by the static misdetection. On the other hand, the proposed method (curve a) does not show such a large reduction in accuracy, while the pedestrian contour tracking using CONDENSATION (curve d) showed an approximately equivalent accuracy to the proposed method. In sequence G2, the proposed method (curve a) shows a large error in the 60th to 120th frames. This is because the end points of the legs of the skeleton are not detected for a long time due to the static detection, causing it as a whole to shift in the (−y) direction.

(Sequences P1, P2 and P3)

Figure 25A:
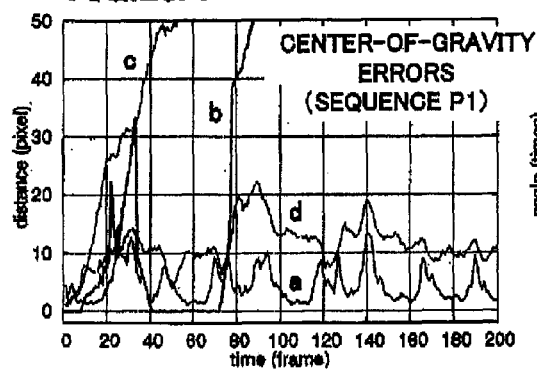
Figure 25B:
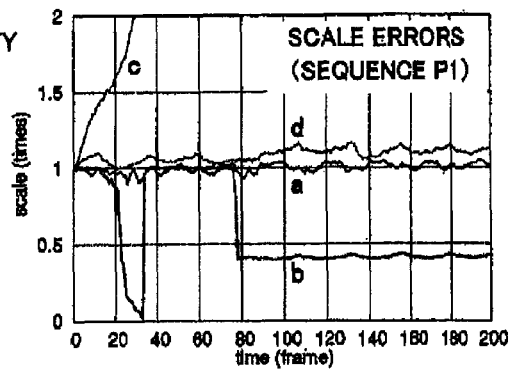
FIG. 25B is a graph showing evaluation results of the scale errors therefor.
Figure 26A:
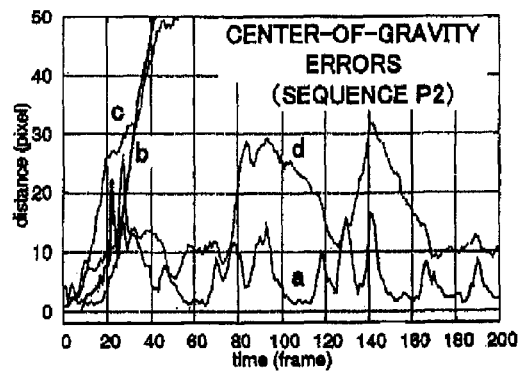
Figure 26B:
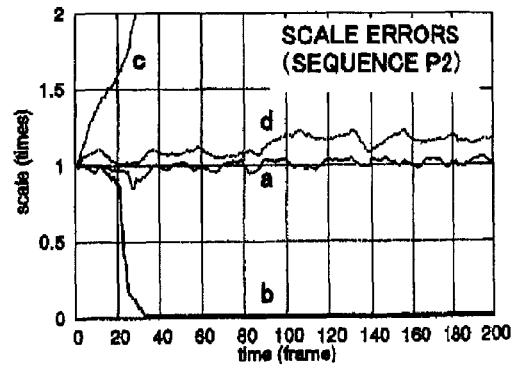
FIG. 26B is a graph showing evaluation results of the scale errors therefor.
Figure 27A:
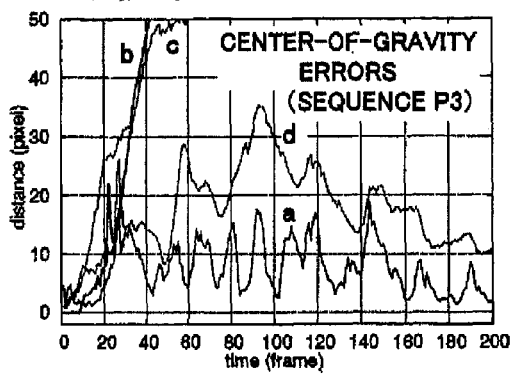
Figure 27B:
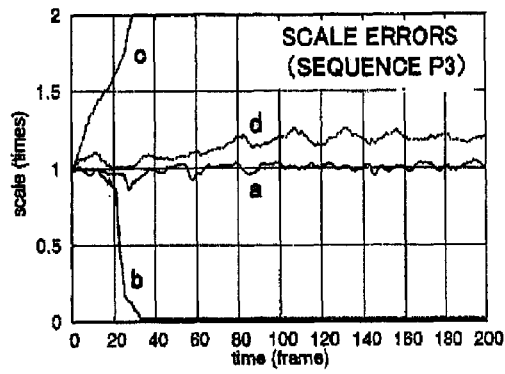
FIG. 27B is a graph showing evaluation results of the scale errors therefor.

FIG. 25A shows evaluation results for sequence P1, and FIGS. 26A and 26B show evaluation results for sequence P2, while FIGS. 27A and 27B show evaluation results for sequence P3. According to the proposed method (curve a), in any sequence of sequences P1, P2 and P3, a center-of-gravity error having become temporarily large can be made small again, showing the best performance. The pedestrian contour tracking using CONDENSATION (curve d) showed an approximately equivalent performance in sequences G1 and G2, but showing particularly large errors in sequences P2 and P3. It is considered that this is because a contour was detected at an interface with a tracking target due to the static misdetection. Further, the center-of-gravity tracking using a Kalman filter (curve b) caused instable center-of-gravity positions due to the static misdetection, failing in tracking.

(Sequences C1, C2, C3 and C4)

Figure 28A:
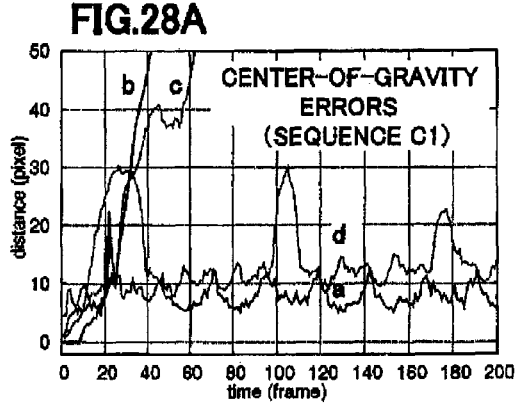
Figure 28B:
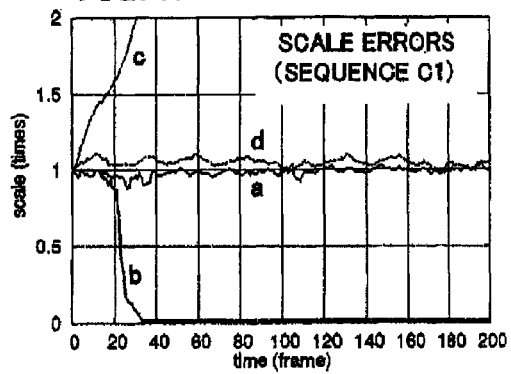
FIG. 28B is a graph showing evaluation results of the scale errors therefor.
Figure 29A:
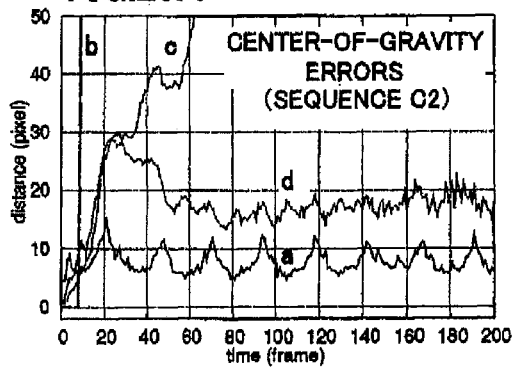
Figure 29B:
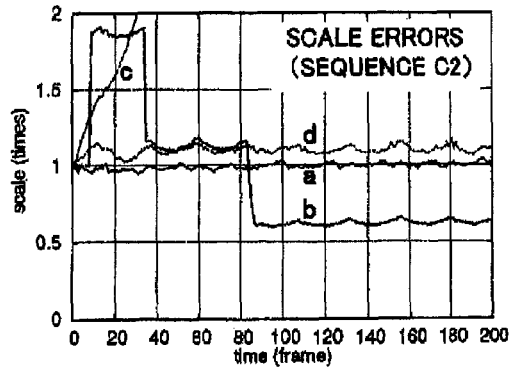
FIG. 29B is a graph showing evaluation results of the scale errors therefor.

FIGS. 28A and 28B show evaluation results for sequence C1, and FIGS. 29A and 29B show evaluation results for sequence C2, while FIGS. 30A and 30B show evaluation results for sequence C3, and FIGS. 31A and 31B show evaluation results for sequence C4. In any sequence of sequences C1, C2, C3 and C4, the proposed method (curve a) showed the best performance. Particularly, in sequences C3 and C4, although substantially the entire region of the tracking target temporarily overlaps the region of the dynamic detection, the proposed method has succeeded in tracking. On the other hand, in the other methods (curves b, c and d), large errors were found due to the dynamic misdetection. The pedestrian contour tracking using CONDENSATION (curve d) caused significant distortion of the contour shape of the pedestrian as indicated by increases in the scale errors in the case where the moving directions of the pedestrian and the dynamic misdetection are the same, failing in tracking. The center-of-gravity tracking using a Kalman filter (curve b) mistracked a region of the dynamic misdetection.

(Actual Sequence U)

First, in the case where the proposed method was applied to sequence U, and the number of particles for each of the skeleton models was varied, the accuracy is evaluated based on a center-of-gravity error calculated as an average of all the frames. The evaluation results are shown in Table 2.

TABLE 2

Evaluations Results in Sequence U (Center-of-Gravity)

| Number of Particles | 100 | 1,000 | 10,000 |
|---|---|---|---|
| Skeleton model (a) | 8.505 | 6.966 | 6.537 |
| Skeleton model (b) | 7.461 | 6.588 | 6.392 |
| Skeleton model (c) | 9.418 | 8.459 | 7.698 |
| Skeleton model (d) | 9.720 | 9.427 | 8.263 |

It could be found from this result that an increase in the number of particles causes an increase in tracking accuracy. It is expected that the skeleton model (b) is most suitable for sequence U because of no hand detection and substantially no shoulder width. It could be found from the result that the expected result is obtained.

FIGS. 32A and 32B show evaluation results for sequence U. In each method, the number of particles was set 1,000 while the skeleton model (b) was used in the proposed method. As a result, the proposed method (curve a) achieved the best tracking accuracy, while the center-of-gravity tracking using a Kalman filter (curve b) and the pedestrian contour tracking using CONDENSATION (curve d) showed approximately equivalent accuracies to the proposed method.

(Actual Sequence S1)

First, in the case where the proposed method was applied to sequence S1, and the number of particles for each of the skeleton models was varied, the accuracy is evaluated based on a center-of-gravity error calculated as an average of all the frames. The evaluation results are shown in Table 3.

TABLE 3

Evaluations Results in Sequence S1 (Center-of-Gravity)

| Number of Particles | 100 | 1,000 | 10,000 |
|---|---|---|---|
| Skeleton model (a) | 71.738 | 41.222 | 26.238 |
| Skeleton model (b) | 52.440 | 27.688 | 6.820 |
| Skeleton model (c) | 53.786 | 26.761 | 11.584 |
| Skeleton model (d) | 48.727 | 27.633 | 8.659 |

It could be found from this result that an increase in the number of particles causes an increase in tracking accuracy. Further, although the skeleton model (d) is expected to be most suitable because of many frames with no hand detection and frames with shoulder width in sequence S1, the results indicate that the skeleton model (b) showed the best performance. This indicates that the influence of shoulder width is not a big problem because the region of the tracking target in sequence S1 is small.

Figure 33A:
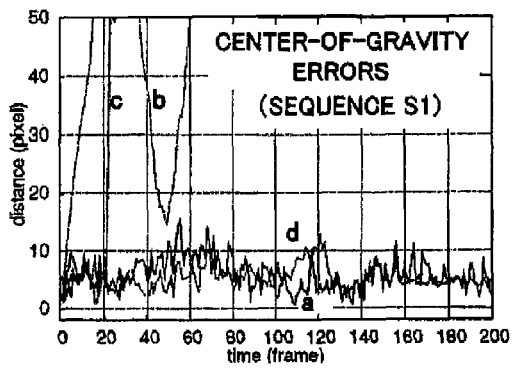
Figure 33B:
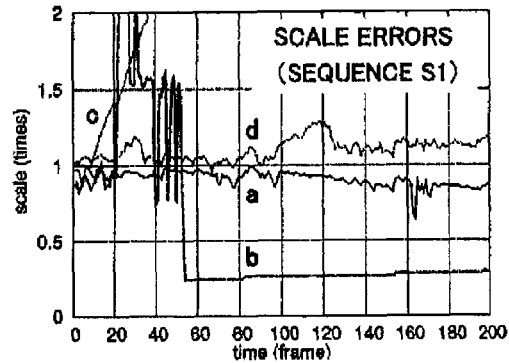
FIG. 33B is a graph showing evaluation results of the scale errors therefor.

FIGS. 33A and 33B show evaluation results for sequence S1. In each method, the number of particles was set 10,000 while the skeleton model (b) was used in the proposed method. As a result, the proposed method (curve a) and the pedestrian contour tracking using CONDENSATION (curve d) show an approximately equivalent performance. On the other hand, the center-of-gravity tracking using a Kalman filter (curve b) cannot adapt to sudden changes in the velocity of the tracking target, and mistracked a different object from the 20th frame and onward.

(Actual Sequence S2)

First, in the case where the proposed method was applied to sequence S2, and the number of particles for each of the skeleton models was varied, the accuracy is evaluated based on a center-of-gravity error calculated as an average of all the frames. The evaluation results are shown in Table 4.

TABLE 4

Evaluations Results in Sequence S2 (Center-of-Gravity)

| Number of Particles | 100 | 1,000 | 10,000 |
|---|---|---|---|
| Skeleton model (a) | 108.847 | 32.693 | 12.333 |
| Skeleton model (b) | 75.874 | 12.270 | 7.801 |
| Skeleton model (c) | 110.883 | 36.250 | 23.430 |
| Skeleton model (d) | 58.349 | 20.794 | 7.847 |

It could be found from this result that an increase in the number of particles causes an increase in tracking accuracy. Further, sequence S2 has many frames with no hand detection in a former part, and many frames with hand detection in a latter part. Further, it has many frames with substantially no shoulder width, so that the skeleton model (a) or (b) is expected to be most suitable. The results indicate that the skeleton model (b) showed the best performance. It is considered that this is because when there are many errors in the former part, the errors are propagated to the latter part.

(Adaptive Skeleton Model)

Figure 34:
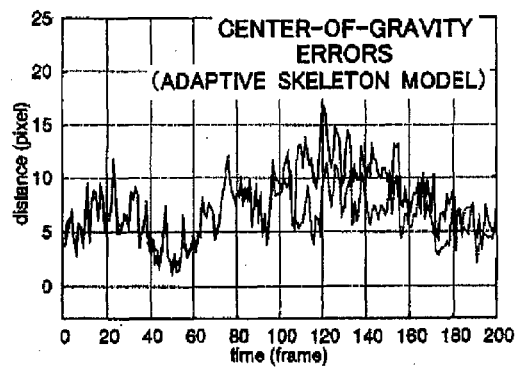
FIG. 34 is a graph showing evaluations results of the center-of-gravity errors when an adaptive skeleton model was used for the pedestrian tracking.

FIG. 34 shows evaluations results of the center-of-gravity errors when an adaptive skeleton model was used for the pedestrian tracking. It is considered that the tracking accuracy is further increased by using the skeleton model (b) for up to the 97th frame with no hand detection, and changing it to the skeleton model (a) from the 97th frame and onward. This model is referred to as an adaptive skeleton model. FIG. 34 shows a comparison of the center-of-gravity errors when the adaptive skeleton model and the skeleton model (b) were used. The number of particles was set 10,000 in each. As a result, the adaptive skeleton model showed a better performance than the skeleton model (b) in the latter part. Although the skeleton models were changed manually here, the accuracy can be further increased by automatically changing the skeleton models while performing tracking.

Figure 35A:
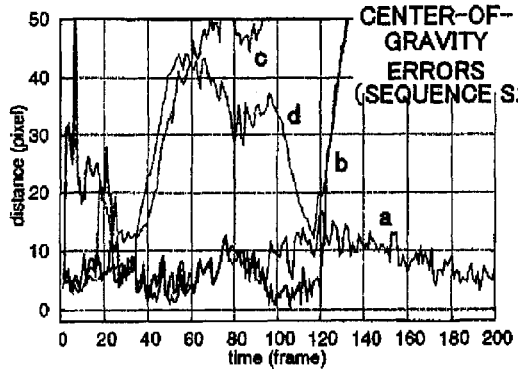
Figure 35B:
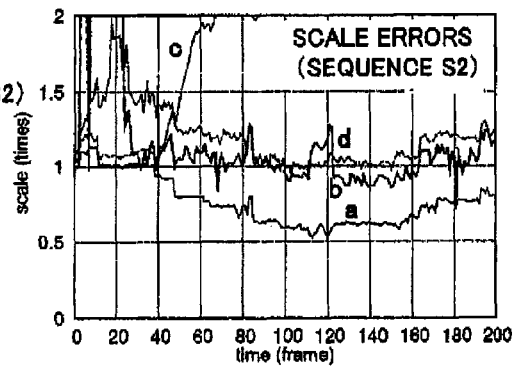
FIG. 35B is a graph showing evaluation results of the scale errors therefor.
Figure 36A:
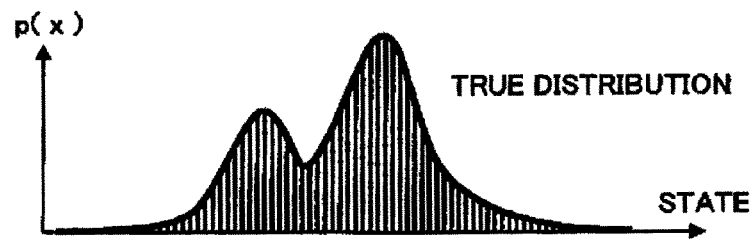
Figure 36B:
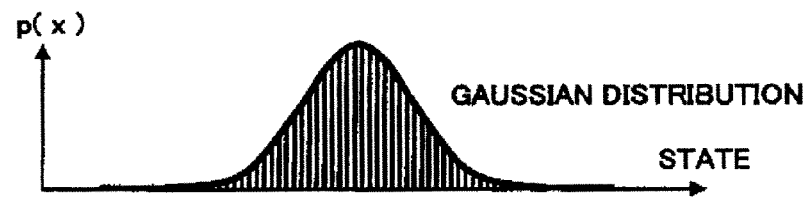
FIG. 36B is a graph of a Gaussian probability density distribution used in a Kalman filter.

FIGS. 35A and 35B show evaluation results for sequence S2. In each method, the number of particles was set 10,000 while the skeleton model (b) was used in the proposed method. As a result, the proposed method (curve a) showed the best tracking accuracy. However, as shown FIG. 35B, the scale errors are significant. This indicates that in sequence S2, the enlargement of an object region due to the motion of the tracking target from the back of the image to the front of the image cannot be accurately predicted. The pedestrian contour tracking using CONDENSATION (curve d) shows significant scale errors around the 20th frame where the tracking target overlaps another object. This means a significant distortion of the estimated contour shape, thus failing in tracking. The center-of-gravity tracking using a Kalman filter (curve b) mistracked another object from the 120th frame and onward.

(Summary)

As demonstrated above, the center-of-gravity tracking using a Kalman filter (curve b) showed good accuracy when the noise was small, but often mistracked dynamic misdetections. In the contour tracking using CONDENSATION (curve c), it is difficult to constrain the transition of the pedestrian contour using principal component analysis, resulting in an increase in the scale error, and having failed in tracking. In the pedestrian contour tracking using CONDENSATION (curve d), an overlap of the tracking target with a region of dynamic misdetection caused a significant distortion of the estimated contour, resulting in a significant reduction in the accuracy.

On the other hand, the proposed method (curve a) achieved stable tracking even in sequences in which the conventional methods (curves b, c and d) failed in tracking. As a result of the comparison of the four patterns of skeleton models (a) to (d), the skeleton model (b) showed a stable accuracy in any sequence. Further, it could be found that an increase in the number of particles causes an increase in the tracking accuracy of the proposed method.

Note that in the proposed method, namely the pedestrian tracking method and the pedestrian tracking device according to the present invention, the static misdetection as in sequence G2 can be improved by adaptively changing the weight factors $\xi$ in equation (36) in the likelihood calculation of particles. Further, for adaptation to an enlarging object, the adaptation can be done by reflecting a factor depending on the moving direction to the calculation of the zoom parameter z shown in equation (22). Further, the proposed method makes it possible to automatically generate an initial state vector from an image. The proposed method can be independently applied to multiple pedestrians in an image, respectively. This makes it possible to track multiple pedestrians at the same time. In this case, the multiple pedestrians can be more efficiently tracked by reflecting the motions of mutually adjacent pedestrians to the likelihood calculation of each other.

Further, it is possible to calculate a variance $\sigma^2$ of the coordinates of the node b in the skeleton models shown in FIG. 8 and FIG. 10, and end the tracking by determining that the tracking target is not a pedestrian if such variance exceeds a certain value. The variance $\sigma^2$ can be given by the following equation (40) where the coordinates of the node b are x,y (coordinates values $x_i, y_i$; i=0~N with averages of $x_m, y_m$):

$$\sigma^2 = \frac{\sum_{i=0}^{N}\{(x_m - x_i)^2 + (y_m - y_i)^2\}}{N} \quad (40)$$

As described above, the addition of the above-described step of calculating the variance $\sigma^2$ of the coordinates of the node b between the trunk stick and the head stick in each skeleton model predicted by a prediction step, and ending the tracking if such variance $\sigma^2$ exceeds a certain value makes it possible to determine from the variance $\sigma^2$ of the coordinates of the node b that the tracking target is not a pedestrian even if a non-pedestrian is erroneously extracted as a pedestrian region, and thus to end the mistracking.

Besides, the present invention is not limited to the arrangements described above, and various modifications are possible. For example, if the pedestrian tracking is fed back to the classification of the candidate regions at a previous stage, it can be used to increase the accuracy. Further, as the morphological skeleton (skeleton model obtained from an image by image processing) to be compared with a skeleton model for the likelihood calculation, not only the method using a distance-transformed image described above, but also a morphological skeleton obtained using an erosion (A⊖B) and an opening (A◇B) can be used. In addition, the pedestrian tracking method and the pedestrian tracking device of the present invention can be applied to various objects such as moving objects including e.g. animals, robots and so on by modeling each of them using a skeleton, not limited to pedestrians.

Note that the pedestrian tracking method and the pedestrian tracking method of the present invention can be formed by a set of processes or functions on a computer having a general structure comprising a CPU, a memory, an external storage device, a display device and an input device.

This application claims priority based on the Japanese patent application dated Jul. 10, 2006, the entire content of which is incorporated by reference into this application.

The invention claimed is:

1. A pedestrian tracking method provided in time series with a certain pedestrian region appearing in images captured continuously in time for predicting and associating motion of the pedestrian region with time direction by use of a Monte Carlo filter so as to track the pedestrian region, comprising the steps of:
    building a skeleton model of a pedestrian model with multiple nodes and multiple sticks connecting the nodes, and defining, in a state space of a multidimensional space representing points in one-to-one correspondence with states of the skeleton model, particles at the points provided with realization probability attributes of the states represented by the points of the state space, and further setting multiple particles of the skeleton model as an initial state in the state space;
    predicting, for a set of particles set in the state space at a first time, a set of particles representing a state at a second time after the first time using Monte Carlo filter method;
    converting a pedestrian region given at the second time to a binary image, and subjecting the binary image to distance transform so as to generate observed data comprised of the distance-transformed image;
    comparing each skeleton model predicted in the prediction step with the distance-transformed image so as to calculate a likelihood of each state of the skeleton model at the second time; and
    sampling a set of particles of the skeleton model in the state space based on the respective likelihoods of the skeleton model calculated in the above step, and setting the sampled set of particles as a new set of particles in the state space at the second time,
    wherein the pedestrian region is tracked by performing, at each time increment, the steps from the above step of predicting the set of particles to the step of setting the sampled set of particles as the new set of particles so as to predict and associate, with time direction, the motion of the particles of the skeleton model in the state space.

2. The pedestrian tracking method according to claim 1, wherein the skeleton model is built of eight sticks consisting of: a trunk stick; a shoulder stick intersecting and connected to an upper end of the trunk stick; a waist stick intersecting and connected to a lower end of the trunk stick; a head stick as an extension of the trunk stick; and four limb sticks connected to both ends of the waist stick and the shoulder stick, respectively.

3. The pedestrian tracking method according to claim 2, wherein the skeleton model can have a state with zero length of the shoulder and waist sticks, a state with zero length of the shoulder, waist and both hand sticks, and a state with zero length of the shoulder and both hand sticks.

4. The pedestrian tracking method according to claim 1, wherein a state of the skeleton model is determined by positions and angles of the respective sticks, which build the skeleton model, and is constrained so that mutual spatial arrangement of the sticks is a spatial distribution which is possible in human body structure.

5. The pedestrian tracking method according to claim 1, wherein the distance-transformed image used in the step of likelihood calculation is an image represented by a black and white density such that its intensity increases as its position shifts from a black contour part representing the pedestrian region to the inside of the contour, and wherein the likelihood of the predicted skeleton model is calculated, with the distance-transformed image being superimposed on the skeleton model, by using a distance from each of the multiple points on the sticks building the skeleton model to a maximum intensity point of the distance-transformed image present on a normal of each stick at the each point.

6. The pedestrian tracking method according to claim 1, wherein random numbers are used in the step of predicting the set of particles and the step of setting the new set of particles, and the random numbers are generated using a pseudo-random number generation algorithm.

7. The pedestrian tracking method according to claim 1, which further comprises a step of calculating a variance of coordinates of a node between trunk stick and head stick, and ending the tracking if such variance exceeds a certain value.

8. A pedestrian tracking device comprising:
image receiving means for receiving, in time series, images captured continuously in time;
pedestrian region selecting means for sampling candidate pedestrian regions from an image received by the image receiving means, and classifying the sampled candidate pedestrian regions into pedestrian regions and non-pedestrian regions, and for selecting a certain pedestrian region;
tracking means provided in time series with the pedestrian region selected by the pedestrian region selecting means for predicting motion of the pedestrian region by use of the pedestrian tracking method according to claim 1 so as to track the pedestrian region; and
pedestrian trajectory display means for displaying, in time series, the pedestrian region tracked by the tracking means.

9. The pedestrian tracking method according to claim 2, wherein a state of the skeleton model is determined by positions and angles of the respective sticks, which build the skeleton model, and is constrained so that mutual spatial arrangement of the sticks is a spatial distribution which is possible in human body structure.

10. The pedestrian tracking method according to claim 3, wherein a state of the skeleton model is determined by positions and angles of the respective sticks, which build the skeleton model, and is constrained so that mutual spatial arrangement of the sticks is a spatial distribution which is possible in human body structure.

11. The pedestrian tracking method according to claim 2, wherein the distance-transformed image used in the step of likelihood calculation is an image represented by a black and white density such that its intensity increases as its position shifts from a black contour part representing the pedestrian region to the inside of the contour, and
wherein the likelihood of the predicted skeleton model is calculated, with the distance-transformed image being superimposed on the skeleton model, by using a distance from each of the multiple points on the sticks building the skeleton model to a maximum intensity point of the distance-transformed image present on a normal of each stick at the each point.

12. The pedestrian tracking method according to claim 3, wherein the distance-transformed image used in the step of likelihood calculation is an image represented by a black and white density such that its intensity increases as its position shifts from a black contour part representing the pedestrian region to the inside of the contour, and
wherein the likelihood of the predicted skeleton model is calculated, with the distance-transformed image being superimposed on the skeleton model, by using a distance from each of the multiple points on the sticks building the skeleton model to a maximum intensity point of the distance-transformed image present on a normal of each stick at the each point.

13. The pedestrian tracking method according to claim 4, wherein the distance-transformed image used in the step of likelihood calculation is an image represented by a black and white density such that its intensity increases as its position shifts from a black contour part representing the pedestrian region to the inside of the contour, and
wherein the likelihood of the predicted skeleton model is calculated, with the distance-transformed image being superimposed on the skeleton model, by using a distance from each of the multiple points on the sticks building the skeleton model to a maximum intensity point of the distance-transformed image present on a normal of each stick at the each point.

14. The pedestrian tracking method according to claim 2, wherein random numbers are used in the step of predicting the set of particles and the step of setting the new set of particles, and the random numbers are generated using a pseudo-random number generation algorithm.

15. The pedestrian tracking method according to claim 3, wherein random numbers are used in the step of predicting the set of particles and the step of setting the new set of particles, and the random numbers are generated using a pseudo-random number generation algorithm.

16. The pedestrian tracking method according to claim 4, wherein random numbers are used in the step of predicting the set of particles and the step of setting the new set of particles, and the random numbers are generated using a pseudo-random number generation algorithm.

17. The pedestrian tracking method according to claim 5, wherein random numbers are used in the step of predicting the set of particles and the step of setting the new set of particles, and the random numbers are generated using a pseudo-random number generation algorithm.

18. The pedestrian tracking method according to claim 2, which further comprises a step of calculating a variance of coordinates of a node between trunk stick and head stick, and ending the tracking if such variance exceeds a certain value.

19. The pedestrian tracking method according to claim 3, which further comprises a step of calculating a variance of coordinates of a node between trunk stick and head stick, and ending the tracking if such variance exceeds a certain value.

20. The pedestrian tracking method according to claim 4, which further comprises a step of calculating a variance of coordinates of a node between trunk stick and head stick, and ending the tracking if such variance exceeds a certain value.

* * * * *